US009652931B2

(12) United States Patent
DiGiovanni

(10) Patent No.: US 9,652,931 B2
(45) Date of Patent: May 16, 2017

(54) COLLUSION DETECTION

(71) Applicant: CFPH, LLC, New York, NY (US)

(72) Inventor: Joe DiGiovanni, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 423 days.

(21) Appl. No.: 14/149,192

(22) Filed: Jan. 7, 2014

(65) Prior Publication Data

US 2014/0194199 A1 Jul. 10, 2014

Related U.S. Application Data

(60) Provisional application No. 61/749,525, filed on Jan. 7, 2013.

(51) Int. Cl.
*A63F 13/00* (2014.01)
*G07F 17/32* (2006.01)

(52) U.S. Cl.
CPC ...... *G07F 17/3239* (2013.01); *G07F 17/3241* (2013.01)

(58) Field of Classification Search
USPC ...................................................... 463/16–42
See application file for complete search history.

(56) References Cited

U.S. PATENT DOCUMENTS 7,699,702 B2 4/2010 Daniel
8,152,619 B2 * 4/2012 Lutnick .................. G07F 17/32 273/292
2002/0155884 A1 * 10/2002 Updike ............... G07F 17/3288 463/25
2005/0164793 A1 * 7/2005 Merimovich ....... G07F 17/3293 463/42
2006/0287068 A1 * 12/2006 Walker ................ G07F 17/3237 463/25
2007/0232398 A1 10/2007 Aikin
2007/0281767 A1 * 12/2007 Fan ....................... A63F 13/005 463/9
2009/0069011 A1 3/2009 Hopkins
2013/0178270 A1 * 7/2013 Flaherty .................. A63F 13/00 463/16

OTHER PUBLICATIONS

Notification of Transmittal of the International Search Report and the Written Opinion of the International Searching Authority for International Application No. PCT/US2014/010471 dated May 8, 2014 (10 pages).

(Continued)

*Primary Examiner* — Masud Ahmed
(74) *Attorney, Agent, or Firm* — Mark Miller

(57) ABSTRACT

Various embodiments that may generally relate to collusion are described. Collusion detection may be used to prevent players in a wagering environment from violating the integrity of a game. Player actions may be tracked to develop a wagering profile that is specific to various game situations. A player acting in a manner that would be against their interest and against their defined profile may be considered a colluding action. Information about collusion actions may be presented for evaluation and/or anti-collusion actions may be automatically taken in response to such collusion actions being determined.

23 Claims, 17 Drawing Sheets

(56) References Cited

OTHER PUBLICATIONS

Smed, et al. "Can We Prevent Collusion in Multiplayer Online Games?", SCAI, 2006 [Retrieved on Apr. 21, 2014] http://www.stes.fi/scai2006/proceedings/168-175.pdf.
Ward, M. et al. "Hacking Networked Games", CSc 566, Computer Security Research Reports, Apr. 2012 [retrieved on Apr. 21, 2014], http://www.cs.arizona.edu/-collberg/Teaching/466-566/2012/Resources/presentations/2012/reports.pdf pp. 52-63.
Shu, Zhan "Detecting Test Cheating Using a Deterministic, Gated Item Response Theory Model" 2010 [retrieved on Apr. 21, 2014] ,http://libres.uncg.edu.ir/uncg/f/Shu_uncg_0154D_10504.pdf>.
Drachen, A et al., "Game Data Mining", Springer Verlag Berlin Heidelberg 2011 [Retrieved on Apr. 21, 2014] <http://andersdrachen.files.wordpress.com/2012/08/gamedatamining_intro.pdf>.
Johansson et al., "Fish or Shark—Data Mining Online Poker", $5^{th}$ International Conference on Data Mining—DMIN 09, Las Vegas, USA, 2009 [Retrieved on Apr. 21, 2014], <http://bada.hb.se/bitstream/2320/5812/1/DMIN09_Poker.pdf>.
Salim et al., "Poker Opponent Modeling", The University of Alberta Poker Research Group, 2005 [Retrieved on Apr. 21, 2014] ,http://citeseerx.ist.psu.edu/viewdoc/download?doi=10.1.1.90.578&rep=rep1&type=pdf>.
Thurau, C, Drachen A (2011) "Introducing Archetypal Analysis for Player Classification in Games". In: Proceedings of the Interantional Workshop on Evaluating Player Experience in Games: At $6^{th}$ International Conference on the Foundations of Digitial Games, EPX'.
Taiwanese Office Action for Application No. 103100488 dated Mar. 7, 2016 (8 pages).

* cited by examiner

A

Hand History for Game 28693

| | | | |
|---|---|---|---|
| Seat Number: | 0 | 2 | 3 |
| Player ID: | Andy Bloch | Eric Seidel | Howard Lederer |
| Starting Chips: | 10058 | 9968 | 10072 |
| Antes: | | | |
| Blinds: | | | |
| | 8h TH | 4c Qd | Jc 3c |
| PreFlop Pocket Strength | SuiteGapOne | Big Gap | SuitedBigGap |
| PreFlop | SuitedHigh | HighLow | SuitedHigh |
| | Fold | Fold | Fold |
| Flop Hand Rank | | | |
| Flop Hand Strength | | | |
| Turn: Ac As 3h Td | | | |
| OnePair | | | |
| Top | | | |
| Turn Hand Rank | | | |
| Turn Hand Strength | | | |
| River: Ac As 3h Td 6c | | | |
| OnePair | | | |
| Top | | | |
| River Hand Rank: | | | |
| River Hand Strength: | | | |
| Showdown: | | | |
| Hand: | | | |
| Starting Chips: | 10058 | 9968 | 10072 |
| Win/Loss | 0 | 0 | 0 |
| Ending Chips | 10058 | 9968 | 10072 |

A

*Fig. 3A*

A

Board Hand Strength smallint
16 bits

(NOT USED PRE-FLOP)

Board Hand Strength

Rank - Community Hand
Strength - Community Hand
Possible Board Draws

Player Actions int
32 bits

Player Actions

AggressivenessActions
TightnessActions
PassivenessActions
LossenessActions
BlindStealActions*
BlindDefendActions*
SqueezePlayActions
SqueezeDefendActions
ContinuationActions
VsContinuationActions

• Do not apply to PRE-FLOP

Player Actions

AggressivenessActions
TightnessActions
PassivenessActions
LossenessActions
BlindStealActions*
BlindDefendActions*
SqueezePlayActions
SqueezeDefendActions
ContinuationActions
VsContinuationActions

• Do not apply to POST-FLOP

Player Bet Techniques int
8 bits

Player Bet Techniques

Bluff
SemiBluff
CheckRaise*
Continuation*
SlowPlay
Trap
BlindSteal
LayDown

• Do not apply to PRE-FLOP

Player Bet Techniques

Bluff
SemiBluff
CheckRaise*
Continuation*
SlowPlay
Trap
BlindSteal
LayDown

• Do not apply to POST-FLOP

A

*Fig. 4B*

Aggressiveness Passiveness Tightness Looseness BlindStealing SqueezePlay Continuation Continuation

| Bit | Label |
|---|---|
| 0 | **First (Raise) In** |
| 1 | **PF Raise** |
| 2 | **Three Bet** |
| 3 | **Four Bet** |
| 4 | FoldToBBorBet |
| 5 | FoldToRaise |
| 6 | FoldToReRaise |
| 7 | FoldToFourBet |
| 8 | **Check to Limp** |
| 9 | **Check to Leader** |
| 10 | **Call to Raise** |
| 11 | **Fold Big Band** |
| 12 | Call Limp |
| 13 | Call PF Raise |
| 14 | Call PF 3 Bet |
| 15 | Call PF 4 Bet |
| 16 | **Opportunity** |
| 17 | **Steal Attempt** |
| 18 | DefendBBlind |
| 19 | FoldBBlind |
| 20 | **SqueezePossible** |
| 21 | **SqueezeAttempt** |
| 22 | Squeezed |
| 23 | SqueezeDefend |
| 24 | **Made C Bet** |
| 25 | **Passed C Bet** |
| 26 | **Reraised CBet** |
| 27 | **Folded CBet** |
| 28 | Bet into |
| 29 | Checked |
| 30 | Raised |
| 31 | Folded |

AggressivenessActions
(4 bits- 0 to 3)
First In
Raise
ReRaise
Fourbet

TightnessActions
(4 bits- 0 to 3)
FoldToBBorBet - Fold to Big Blind or Open Bet
FoldToRaise
FoldToReRaise
FoldToFourbet

PassivenessActions
(4 bits- 0 to 3)
CheckToLimp
CheckToLeader
CallToRaise
FoldBBlind

LoosenessActions
(4 bits- 0 to 3)
CallLimp
CallRaise
CallReRaise
CallFourBet

BlindStealActions
Opportunity - pot unopened at cuoff or button or SB
StealAttempt - player attempts steal of unopened pot

BlindDefendActions
DefendBBlind
FoldBBlind

SqueezePlayActions
Previous Raise followed by 1 or more callers
Reraised when Squeeze possible

SqueezeDefendActions
Previously Called a Raise now being Reraised
Called ReRaise when squeezed

ContinuationActions
(4 bits- 0 to 3)
Made Continuation Bet
Checked - Passed on Continuation Bet
Made Bet/Checked then Reraised Raiser
Made Bet/Checked then Folded to Bet/Raise

VsContinuationActions
(4 bits- 0 to 3)
Bet into opponent with previous action
Checked to opponent with previous action
Raised Continuation Bar
Folded to Continuation Bet

A

A

Fig. 6A

A

Player Bet Technique Actions int
8 bits

| Bluff | SemiBluff | Check Raise | Continuation | Slow Play | Trap | Blind Steal | Lay Down |
|---|---|---|---|---|---|---|---|
| 0 | 1 | 2 | 3 | 4 | 5 | 6 | 7 |

Bluff
Player makes Bet or Raise with very weak hand

SemiBluff
Player makes Bet or Raise with average hand & draws

CheckRaise
Player Checks with strong hand and then ReRaises

Continuation
Player Raised previous round and bets/raises current round

SlowPlay
Player Checks with strong hand and Calls all Raises

Trap
SlowPlay to entice Bet/Raise and Calls but the ReRaises

BlindSteal
Player Raises with weak hand in late position and no other Raises

LayDown
Player Folds with a strong or very strong hand

A

*Fig. 6B*

Fig. 7A

A

| | | Full | Short | Heads Up | Vol. Put 5 in Pot | | | |
|---|---|---|---|---|---|---|---|---|
| | | | | | | 24% | 28% | 33% |
| Monkey | **Very aggressive - likes to bluff. Slow play against** | | | | | | | $$$ |
| | Aggression Factor | > 2 | > 2 | > 4 | | | | |
| | VP $IP | > 35% | > 40% | > 65% | | | | |
| | Pre-Flop Raise | > 20% | > 14% | > 45% | | | | |
| Lion | **Loose and aggressive. Likes to bluff.** | | | | | | $$$ | |
| | Pre-Flop Raise | > 8% | > 15% | > 35% | | | | |
| | Aggression Factor | > 2 | > 2 | > 3 | | | | |
| | VP $IP | > 20% | > 25% | > 50% | | | | |
| Shark | **Tight and aggressive. Good player.** | | | | $$$ | | | |
| | Pre-Flop Raise | > 8% | > 15% | > 35% | | | | |
| | Aggression Factor | > 2 | > 2 | > 3 | | | | |
| | VP $IP | > 20% | > 25% | > 50% | | | | |
| Fish | **Plays too many hands. Bet for value.** | | | | | | | $$$ |
| | Pre-Flop Raise | > 8% | > 15% | > 35% | | | | |
| | Aggression Factor | <= 2 | <= 2 | <= 3 | | | | |
| | VP $IP | > 20% | > 25% | > 50% | | | | |
| Elephant | **Very loose player who will play any two cards** | | | | | $$$ | | |
| | VP $IP | > 20% | > 35% | > 60% | | | | |
| Calling Station | **Calls all the time. Bet for value. Do not bluff.** | | | | | | $$$ | |
| | Aggression Factor | <= 12 | <= 12 | <= 2 | | | | |
| | VP $IP | > 25% | > 25% | > 50% | | | | |
| | To Showdown | > 30% | > 40% | > 40% | | | | |
| Duck | **Very weak player. Bet for value.** | | | | | | $$$ | |
| | Pre-Flop Raise | <= 8% | <= 15% | <= 35% | | | | |
| | Aggression Factor | <= 2 | <= 2 | <= 3 | | | | |
| (overvalue hands) | Aggression Factor | > 2 | > 2 | > 3 | | | | |
| | VP $IP | > 20% | > 25% | > 50% | | | | |
| Bear | **Tight and passive. Not much action.** | | | | $$$ | | | |
| | Pre-Flop Raise | > 8% | > 15% | > 35% | | | | |
| | Aggression Factor | <= 2 | <= 2 | <= 3 | | | | |
| | Aggression Factor | > 2 | > 2 | > 3 | | | | |
| | VP $IP | <= 20% | <= 25% | <= 50% | | | | |
| Mouse | **This is a timid Player. Can be easily bluffed.** | | | | $$$ | | | |
| | Pre-Flop Raise | <= 8% | <= 15% | <= 35% | | | | |
| | Aggression Factor | <= 2 | <= 2 | <= 3 | | | | |
| | VP $IP | > 20% | > 25% | > 50% | | | | |

A

A

| Aggression Factor | | | Show Down | | | | Pre-Flop Raise | VP$IP | Aggr Factor | Show Down |
|---|---|---|---|---|---|---|---|---|---|---|
| 1.00 | 1.50 | | | 39% | | | | | | |
| | | x | | | | LOOSE Aggressive | | | | |
| | | | | | | Full Table | >20% | >36% | >2 | |
| | | | | | | Short Table | >25% | >40% | >2 | |
| | | | | | | HeadsUp | >45% | >65% | >4 | |
| | x | x | | | x | Slightly Loose Neutral Overplay | | | | |
| | | | | | | Full Table | > 8% | >20% | >2 | |
| | | | | | | Short Table | | | | |
| | | | | | | HeadsUp | | >50% | | |
| | | x | | x | | TIGHT Aggressive Solid | | | | |
| | | | | | | Full Table | > 8% | <=20% | >2 | |
| | | | | | | Short Table | | <=45% | | |
| | | | | | | HeadsUp | | <=50% | | |
| x | x | | | | | LOOSE Passive | | | | |
| | | | | | | Full Table | > 8% | >20% | >2 | |
| | | | | | | Short Table | | | | |
| | | | | | | HeadsUp | | >50% | | |
| x | x | | | | | Neutral Passive | | | | |
| | | | | | | Full Table | | > 30% | | |
| | | | | | | Short Table | | >=35% | | |
| | | | | | | HeadsUp | | >=60% | | |
| x | | | | | | Slightly Loose Passive | | | | |
| | | | | | | Full Table | | >25% | <=1.2 | >30% |
| | | | | | | Short Table | | >40% | <=1.2 | |
| | | | | | | HeadsUp | | >40% | <=2 | |
| | x | | | | | Slightly Loose Neutral | | | | |
| | | | | | | Full Table | <= 8% | >20% | <= 2 | |
| | | | | | | Short Table | | | | |
| | | | | | | Short Table | | | | |
| | | | | | | HeadsUp | | >50% | | |
| x | | | | x | | TIGHT Passive Solid | | | | |
| | | | | | | Full Table | > 8% | <=20% | <= 2 | |
| | | | | | | Short Table | | | | |
| | | | | | | Short Table | | | | |
| | | | | | | HeadsUp | | <=50% | | |
| x | | | | | x | TIGHT Passive Overplay | | | | |
| | | | | | | Full Table | <= 8% | <=20% | <= 2 | |
| | | | | | | Short Table | | <=25% | | |
| | | | | | | HeadsUp | | <=50% | | |

A

*Fig. 7B*

Round, Position Table Size (change each round)

Post Flop, Round, (skip 0 - only need 5), (Holdem 4 - Stud 5), Position, (Early to Blind), TableSizeCode, (HU Short Full)

0 1 2 3 4 5 6 7

PostFlop (1 bit)
- 0 False
- 1 True

Round (3 bits - 0 to 7)

Holdem/Omaha
- 0
- 1 PreFlop
- 2 Flop
- 3 Turn
- 4 River 7-card Stud
- 0
- 1 3rd street - pockets + 1up
- 2 4th street - up card
- 3 5th street - up card
- 4 6th street - up card
- 5 7th street - down card

Position (2 bits - 0 to 3)

PreFlop
- 0 Bind
- 1 Late
- 2 Middle
- 3 Early

PostFlop
- 0 Early
- 1 Middle
- 2 Late
- 3 Button

TableSizeCode (2 bits - 0 to 3)
- 0 HeadsUp
- 1 Short (3,4,5)
- 2 Medium (6,7)
- 3 Full (8,9,10)

Player Collusion Actions int
8 bits

SoftPlay, ChipDumping, SqueezePlay, SharedCards 0 1 2 3 4 5 6 7

SoftPlay
Two teams members do not bet into or raise partners

ChipDumping
Team member deliberately loses to partner

SqueezePlay
Team members re-raising around third player

ShareCards
Team members share ard Knowledge - hard to detect

*Fig. 8*

COLLUSION DETECTION

CROSS REFERENCE TO RELATED APPLICATIONS

This application claims priority to U.S. provisional application 61/749,525 filed Jan. 7, 2013, which is hereby incorporated herein by reference. U.S. patent application Ser. No. 13/110,519 filed May 18, 2011; U.S. Provisional Application No. 61/680,168, filed Aug. 6, 2012; and U.S. Provisional Application 61/642,812, filed May 4, 2012 are hereby incorporated herein by reference.

FIELD

Some embodiments may generally relate to gaming and/or mobile devices.

BACKGROUND

Mobile devices, such as cellular telephones, PDAs, notebook computers, and/or various other devices may be used by individuals. Gaming, such as casino gaming, sports wagering, video gaming, and/or various other forms of gaming may be performed.

SUMMARY

The following should be understood as example embodiments, and not as claims.

A. A method comprising: monitoring, by a computing device, play of a player in a plurality of games; generating, by the computing device, profile data for the player based on the monitored play; determining, by the computing device, that an action by the player in a second game results in a collusive outcome; in response to determining that the action by the player results in the collusive outcome, determining, by the computing device, that the action deviates from the profile data; and in response to determining that the action deviates from the profile data, taking, by the computing device, a collusion prevention action.

A.1. The method of claim A, in which determining that the action deviates from the profile data includes determining a probability that the action is not in line with historical play of the player by comparing the action to the profile data. A.2. The method of claim A, in which the collusive outcome includes a transfer of a large amount of chips from the player to another player in the second game. A.3. The method of claim A, in which determining that the action results in the collusive outcome includes determining a severity of collusion based on the collusive outcome and in which the determination that that action deviates from the profile data is adjusted to account for the severity so that a higher deviation is required to make the determination for a lower severity and a lower deviation is required to make the determination for a higher severity.

A.4. The method of claim A, comprising determining a likelihood of collusion and presenting the likelihood to a collusion detector. A.4.1. The method of claim A, comprising determining a high likelihood of collusion in response to determining that the collusive outcome is a highly severe collusion and deviation from the profile data is great. A.4.2. The method of claim A, comprising determining a low likelihood of collusion in response to determining either a) that the collusive outcome is not severe or b) that deviation from the profile data is not great. A.5. The method of claim A, comprising determining an ongoing collusion rating for the player over the plurality of games based on a percentage of possible collusive actions detected over those games and present that collusion rating to a collusion detector.

A.6. The method of claim A, in which the collusion prevention action includes presenting information to a collusion detector through a user interface that allows the collusion detector to perform at least one of undue a result of the second game, ban the player from gameplay, halt gameplay by the second player, and cause a replay of the second game. A.6.1. The method of claim A.6, comprising recording history of the second game, and in which the user interface allows the collusion detector to access recorded game history of the second game. A.6.1.1. The method of claim A.6.1, in which the user interface is configured to allow the collusion detector to access recorded game history in context of the game. A.6.1.2. The method of claim A.6.1, in which the game history allows the collusion detector to recreate the second game.

A.7. The method of claim A, comprising storing the profile data in a vector, in which each dimension of the vector represents a determined behavior of the player. A.7.1. The method of claim A.7, in which one dimension of the vector includes a tightness of play dimension determined by a small blind completion percentage in poker games. A.7.2. The method of claim A.7, in which one dimension of the vector includes an aggression dimension determined by a bet and raise percentage post flop compared to a call percentage post flop in Texas hold'em games. A.7.3. The method of claim A.7, in which dimensions of the vector are situationally-generic dimensions. A.7.4. The method of claim A.7, in which dimensions of the vector are specific to a context in which behavior is observed. A.7.4.1. The method of claim A.7.4, in which a context for a dimension of the vector is defined by at least one of a hole card strength and a hand strength of the player in the context. A.7.5. The method of claim A.7, comprising estimating a dimension for the vector when there is not sufficient information for the dimension by referencing one or more other dimensions in the vector. A.7.6. The method of claim A.7, comprising determining a dimension of the vector by weighting data so that more recent games are given more weight than less recent games for the dimension.

A.8. The method of claim A, comprising generating the profile data to identify historical actions taken in each of a plurality of gaming situations. A.9. The method of claim A, comprising generating the profile data to identify historical actions taken against each of a plurality of types of players. A.10. The method of claim A, in which monitoring play of the player includes operating an electronic platform through which the player may play the plurality of games against a plurality of other players and determining actions in those games taken through the electronic platform.

B. An apparatus comprising: a computing device; and a non-transitory medium having stored thereon a plurality of instruction that when executed by the computing device cause the apparatus to: monitor play of a player in a plurality of games; generate by the computing device, profile data for the player based on the monitored play; determine that an action by the player in a second game results in a collusive outcome; in response to determining that the action by the player results in the collusive outcome, determine that the action deviates from the profile data; and in response to determining that the action deviates from the profile data, take a collusion prevention action.

BRIEF DESCRIPTION OF THE DRAWINGS

FIG. 6 (in parts, A and B) shows an example data structure of player actions according to some embodiments.

FIG. 7 (in parts, A and B) shows examples of player profile categories according to some embodiments.

FIG. 8 shows an example data structure of collusion actions according to some embodiments.

DETAILED DESCRIPTION

I. Example Embodiments

Figure 1:
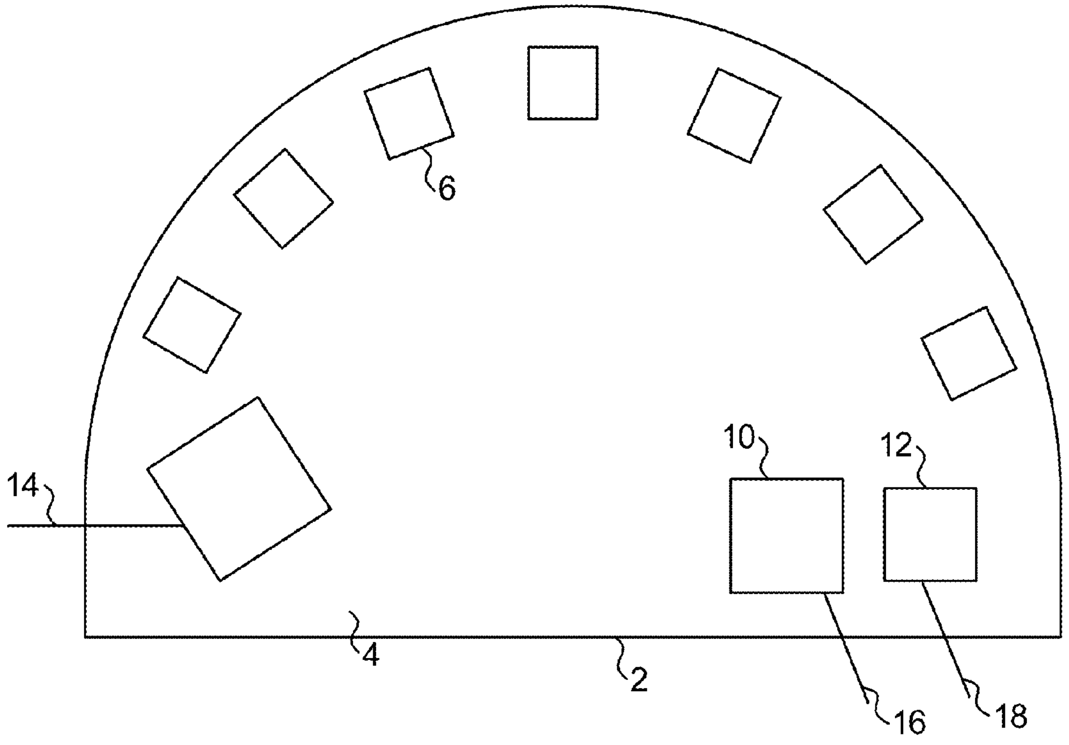
FIG. 1 shows a block diagram of a hand-reading system of some embodiments.

Some embodiments may facilitate gaming. For example one or more users may play in a game together. The game may be a competitive wagering game such as a card game, a video game, a tile based game (e.g., mahjong), a casino game and/or any other game. For example, some embodiments may include a card game of poker (e.g., Texas Hold'em, Omaha, draw, stud, etc.). Some examples of a poker game are given in application Ser. No. 13/110,519, which has been incorporated by reference herein. It should be recognized that any arrangement and/or combination of games may be used in various embodiments.

Some embodiments may include gaming with physical components (e.g., cards. Some embodiments may include gaming with virtual components (e.g., virtual cards). Some embodiments may include any combination of physical and virtual components. For example, some embodiments may include gaming at a physical table with physical cards. Data may be tracked in such a situation through camera tracking, card RFID tracking, and so on. As another example, some embodiments may include gaming with computing devices using virtual cards. Some examples of such devices are given in application 61/680,168, which has been incorporated by reference herein. Such computing devices may include stationary devices such as desktop computers or kiosks, mobile devices such as smart phones, and/or any other devices desired. It should be recognized that any combination of devices and/or physical elements may be used in any combination or arrangement in various embodiments.

Some embodiments may include one or more collusion prevention actions, methods, devices, and/or other elements. Collusion in a competitive game may undermine the integrity of a game experience for those players that do not engage in collusion. Collusion may be considered cheating in a game and may be against the rules of play of the game. Those that engage in collusion often take actions to prevent detection of their collusive behavior. This can make collusion detection difficult and various described features of various embodiments described herein may overcome some of the difficulty in detecting collusion.

Collusion can take many forms. Some example forms of collusion may include deliberately losing or causing another player to win, chip dumping from one player to another, casual play rather than competitive play in a tournament, passive play rather than aggressive play against a particular player, lack of raising against a particular player, combining betting patterns with a teammate to squeeze out another player at a table, and so on. Whether a particular type of action is actually considered against the rules of a game may vary from embodiment to embodiment. For example, some embodiments may allow some forms of collusion but not others (e.g., casual play may be allowed but chip dumping and squeezing out may not be allowed). Other embodiments may not allow any form of collusion. And, still other embodiments may allow all forms of collusion. Such examples of collusion activity are given as non-limiting examples only and other embodiments may relate to any desired collusion behavior.

Collusion detection can similarly take many forms. For example, in some embodiments, gameplay of one or more players and/or games may be monitored to determine possibilities of collusion. Such monitoring may include receiving data about a game (e.g., from a gaming server, form players, from cameras, from RFID readers, from a data collection device, from a source of the data such as a random number generator or game result engine, and so on). Such data may be recorded and analyzed to determine possible collusion. Such possibilities may be flagged for investigation and/or tracked for pattern recognition. Actions may be taken in response to determinations of a possible collusion activity (e.g., based on the likelihood of the possibility and/or severity of the collusion). For example, players may be banned, game play may be halted, an investigation may be conducted, authorities may be notified, a game may be replayed, results may be invalidated, players may be removed from a tournament, players may be prevented from future paring in a game, and so on. It should be recognized that collusion detection examples are given as non-limiting examples only and that other embodiments may include any desired collusion detection elements.

It should be recognized that various elements of described embodiments may be combined in any manner and that examples given herein are non-limiting examples only. It should further be recognized that while some examples are given in terms of poker, tracked play characteristics, collusion actions, collusion detection methods, responses to collusion, and so on, that these descriptions are given as non-limiting examples only.

In some embodiments, collusion detection may include an attempt to determine a change in play style, betting actions, or other behavior. Collusion detection may include evaluating gameplay over time to detect patterns and/or divergences from patterns, create player behavior profiles in specific situations, and so on. An example of player profile and indexing elements is given in application 61/642,812, which has been incorporated by reference. Collusion detection may include determining teamed up players in a competitive game where players should not be teamed up based on analysis of determined behavior dimensions and/or tracked actions in one or more games. Some embodiments may include tracking player behavior, gathering player statistics, detecting play patterns, detecting collusion using this information, preventing collusion based on detected collusion, and so on. Some embodiments may use tracked information to research collusion and learn previously unknown collusion techniques that may be detectable and/or preventable to improve the integrity of a game. Such methods may be very difficult to detect without robust tracking and/or analysis elements.

Figure 3B:
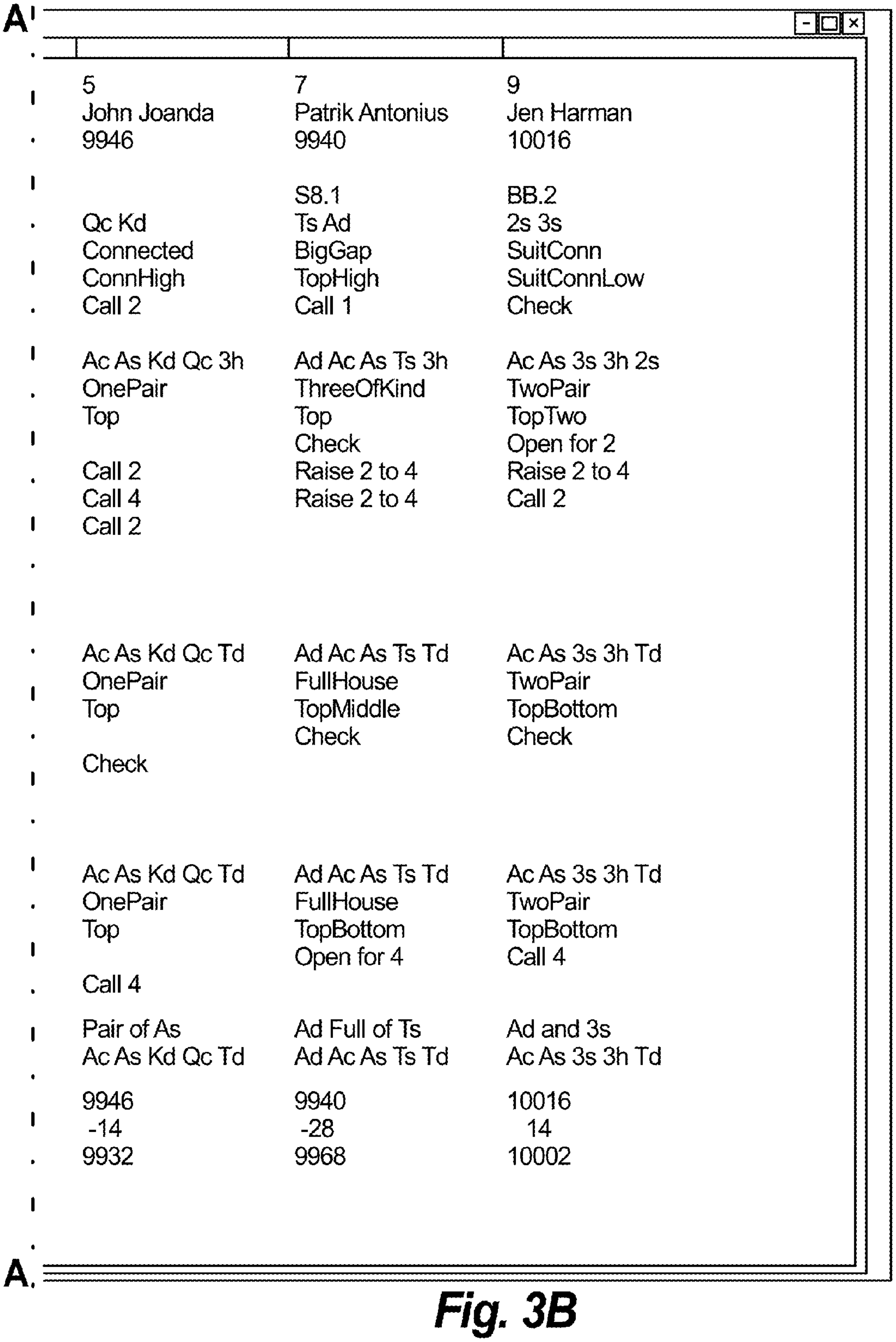
FIG. 3 (in parts, A and B) shows example information storage according to some embodiments.

Some embodiments may include recording information about one or more games. Such information may include actions that took place in the game, cards dealt in the game, players of the game, bets made in the game, results of the game, positions in the games, and/or any desired information about the game. FIG. 3 illustrates some example information that may be stored about a game. Such information may be used for re-creation of a game at a later date, for analysis purposes to determine collusion behavior in that game or other games, to research collusion activities, and/or for any other desired reasons. It should be recognized that such examples of storing game information are given as non-limiting examples only and that other embodiments may not store such information or may store different information as desired.

Some further examples of information about a game, round, and/or tournament that may be determined and/or stored may include game type, tournament type, limit type, tournament or not, rebuy allowed or not, and so on. Further examples of information about a game, round, and/or tournament that may be determined and/or stored may include position of blind, blind status, which cards were used at each point in the game to make a player's hand, result, pot amount(s), bets, etc. Still further examples of information about a game, round, and/or tournament that may be determined and/or stored may include strength of hand(s) (may be relative and/or absolute), whether there is a pair, whether there is a straight or flush possibility, whether suited cards are dealt to a player, strength of pocket cards, rank of player hand, player hand strength vs. other players, possible draws, dealt community cards, and so on.

Figure 4A:
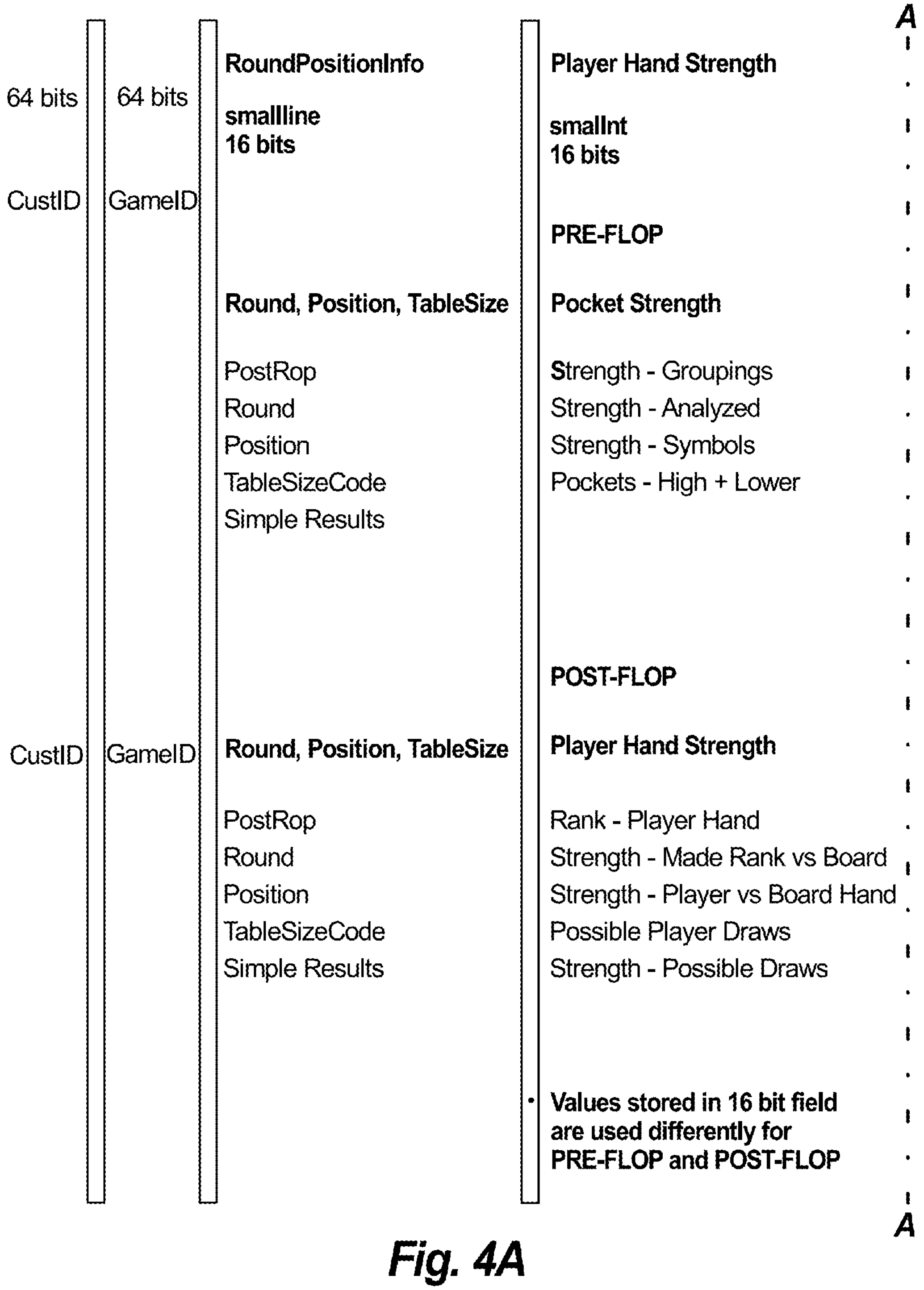
FIG. 4 (in parts, A and B) shows an example data structure of game actions according to some embodiments.

Some embodiments may include recording player action information for one or more games, rounds, tournaments, and so on. Such player action information may be stored in a vector or other data structure. Dimensions of such a profile may describe actions or behaviors of a player in a game. Some example dimensions may include a tight vs. loose play dimension, an aggressive vs. nonaggressive play dimension, a bluff dimension, a semi-bluff dimension, a long shot play dimension, a reach draw dimension, player position, hand strength, community card strength, possible draw strength, player actions (pre and/or post flop), player bet techniques (pre and/or post flop), round specific data, game generic data, and/or any desired dimension. A dimension may be specific for a round of play or a game at a large. A vector or other data structure describing each dimension may be stored in a database for each situation that it is relevant to. Such information may be accessed to form a player profile and/or for investigation of collusion activity to review previous behavior of a player. Such information may be determined for each desired game and/or each desired player in each game (e.g., every player, every game, every player except trusted players). FIG. 4 illustrates an example data structure that may be used for recording player behaviors in a game. It should be recognized that such dimensions and data structure are given as a non-limiting example only. It should further be recognized that the use and/or recording of such information at all is given as a non-limiting example and that other embodiments may directly create player behavior profiles without the recording or generation of such specific game or round level data.

Figure 5:
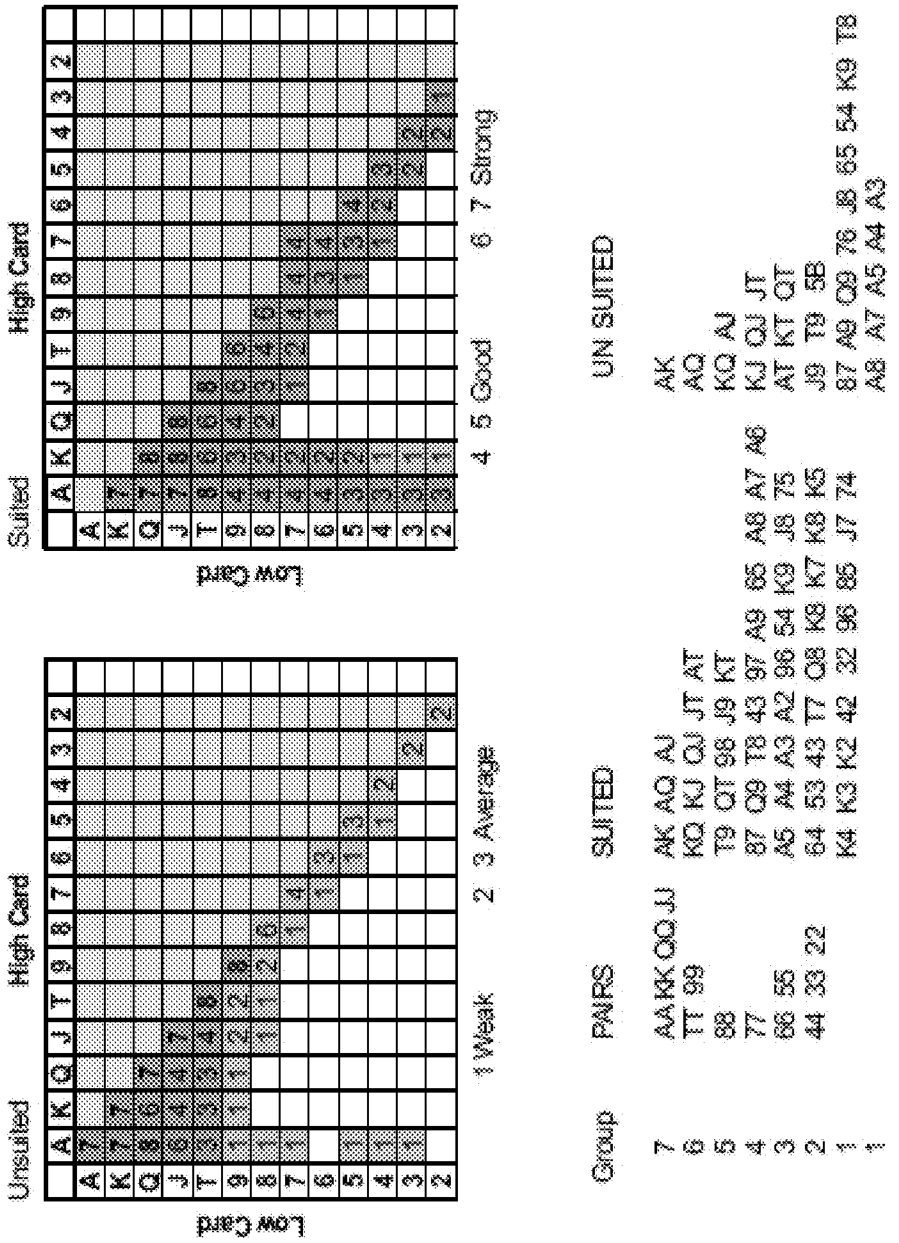
FIG. 5 shows example hand strength determinations according to some embodiments.

FIG. 5 illustrates an example of hand strength determination that may be used in some embodiments. As discussed above, some embodiments may include hand strength dimensions or other data. FIG. 5 illustrates how in some embodiments, hole cards in a Texas Hold'em game may be assigned rank strength into a rank category. In some embodiments, hand strength determinations may be absolute and/or relative to other player's hands. In some embodiments, hand strength determinations may be based on community cards. A strength may be lower if all or more cards come from community cards rather than hole cards. It should be recognized that such example strength categories are given as non-limiting examples only and that some embodiments may not even include such categories but rather may include separate strength information for each combination or no strength dimensions at all.

Some embodiments may include determining detailed and/or context-specific game information for one or more games. Such information may include placing information about player actions into game context. For each desired game and/or each desired player in each desired game, such information may be determined. In some embodiments, such information may be separately determined for each round of a game for each player to identify the round specific level of player behavior. Such information may include, for example, bluffing and/or semi-bluffing actions, check raising actions, continuation actions, slow play actions, trap actions, lay down actions, blind steal actions, vs. continuation actions, squeeze play and/or defense actions, blind defense actions, passive actions, looseness indicating actions, tightness indicating actions, aggressive actions, and so on. FIG. 6 illustrates an examples data structure and set of action that may be used in some embodiments to record such information. With such information, a robust player profile may be generated for each desired player. It should be recognized that the determination of such information, the data structure, and the information are given as non-limiting examples only. Other embodiments may not include such actions or may determine different information stored in different data structures as desired. Such information may be used, in some embodiments, in place of the information discussed with respect to FIG. 4, in addition to the information of FIG. 4, and so on. Such information may be duplicative, different from, additive, in replace of, and so on to the information of FIG. 4.

An example determination of a tightness of play dimension may include determining a small blind completion percentage. If the player sees the flop when a small blind a high percentage of time, then the player may play loose. If the player sees the flop when small blind a lower percentage of time, then the player may play tight. It should be recognized that this example of tightness indication is a non-limiting example only and that other methods of determining tightness may be used as desired.

An example determination of an aggression of player dimension may include determining bets and raises compared to calls post flop. For example, in some embodiments an aggression factor may be determined by dividing post flop bets and raises by post flop calls. The higher the number, the more likely the player is to be aggressive without warrant. The lower the number the more passive the player may be when aggression is warranted. An aggression factor $<1$ may be considered a passive player. An aggression factor over 1.5 may be considered an aggressive player. An aggression factor between 1 and 1.5 may be considered a neutral player. It should be recognized that this example of aggression indication is a non-limiting example only and that other methods of determining aggression may be used as desired.

Any combination of information may be collected that may be used for a category determination and/or otherwise collected as part of a player profile that may or may not be used to determine a player style category (e.g., may be used as general style information for a category determination or not). Some examples may include how often a player does something in given situations, how often a player puts money in when under the gun (first to act), how often a player puts money in against certain players or players with certain play styles, how often a player pre-flop raises, how often a player pre-flop raises when last to act before the flop, how often a player calls pre-flop, how often a player calls pre-flop when big blind, how often a player raises first, how often a player raises first when in the middle position, how often a player calls pre-flop with a strong hand (over all strong and/or relative strong) and/or a weak hand, how often a player calls post-flop with a strong hand and/or weak hand. It should be recognized that these are example pieces of information only and that various embodiments may include more, less, different, no, and so on information as desired to help determine player behavior expectations. Some embodiments may include determining a number of situations when an action could occur and the number of times an action is taken in those situations to determine such a piece of information. Such information may be updated overtime as more information is obtained.

As still further examples illustrating possible dimensions, statistics and levels of robustness, some embodiments may include determining total number of hands (#H), percentage of voluntarily putting money in the pot (% of games a player voluntarily puts money in the pot pre-flop), pre-flop raise percentage, 3bet pre-flop % (% times a player raises pre-flop when facing a raise), % of time a player raises unopened pot pre-flop from the cutoff/button/small blind position, a player aggression factor (e.g., as in the example above), % of continuation bet on flop (% of time a player bets the flop after being the pre-flop raise), % of time a player went to showdown (measure whether player is solid or overplayed), chip amount that this player is up or down, and so on.

As an example of determining a voluntarily put money in the pot percentage, some embodiments may count a times that the player puts money in the pot when the player is not required to do so. For example, blinds paid by a player may not count to such percentage but rather, raises, bets, and/or call may count. Such a statistic may measure a player's playing style in regard to tightness vs. looseness of play. Tight play may be in the less than 24% rate, neutral may be 24 to 28%, slightly loose may by 28 to 33 and loose may be 33% and over. It should be recognized that this example of voluntarily putting money in the pot calculations are given as non-limiting examples only. Other embodiments may include an amount of money or other actions may be counted such as including blinds.

Determining a % of time a player went to showdown may include determining a number of times a player saw the flop and did not fold afterward. For example, the number of times the player stayed in the game to see the flop may be determined and the percentage of those times that the player did not fold in the game may be determined to calculate a % of time the player went to showdown. Greater than 39% may be considered over played. Less than 39% may be considered solid play style. It should be recognized that this example of showdown calculations is a non-limiting example only and that other methods of making such a showdown calculation may be used as desired.

It should be recognized that any actions or analysis of actions may be determined based on player behavior. Further examples of actions that may be tracked (e.g., each round, each game, each tournament, etc.) may include aggressive actions (first in, raise, re-raise, four bet), tightness actions (e.g., fold to big blind or open bet, fold to raise, fold to re-raise, fold to four bet), passive actions (check to limp, check to leader, call to raise, fold to big blind), looseness actions may be tracked (e.g., call to limp, call to raise, call to re-raise, call to four bet), blind steal actions may be tracked (e.g., player raises with weak hand in late position and no other raisers), blind defensive actions may be tracked (e.g., defend a big blind, fold a big blind), squeeze play actions may be tracked (e.g., previous raise followed by one or more calls, re-raise when squeeze possible), squeeze defend actions may be tracked (e.g., previously called a raise now being re-raised, called re-raise when squeezed), continuation actions may be tracked (e.g., made continuation bet, checked-passed on continuation bet, made bet/checked then re-raised raise, made bet/checked then folded to bet/raise, player raised previous round and bets/raises current round), versus continuation actions may be tracked (e.g., bet into opponent with previous action, check to opponent with previous action, folded to continuation bet, raised to continuation bet), bluff actions may be tracked (player makes bet or raise with very weak hand), semi-bluff actions may be tracked (e.g., player makes bet or raise with average hand), check raises may be tracked (player checks with strong hand then re-raises), slow play may be tracked (e.g., player checks with strong hand and calls all raises), lay down actions may be tracked (e.g., player folds with a strong or very strong hand), and/or any desired actions may be tracked. Tracked actions may be generically tracked and/or tracked with reference to the specific context in which the actions occur. For example, betting actions in various context may be tracked to determine a behavior profile of a player in specific situations. For example, a determination may be made regarding when a player raises with a strong hand, raises with a weak hand, folds with a strong hand, folds with a weak hand, makes any betting action against a player with a specific play style (e.g., actions against lions, actions), makes betting actions against a specific player.

For example, a determination regarding play style when a player holds pocket aces may be made. It may be typical for players to raise or check-raise in this situation. Each player, however, may approach this situation differently, and some players, as an example, may always slow-play a strong hand such as this. Tracking this trend may prevent a valid slow play from being confused with a collusion event where a player does not bet into a colluding teammate.

As another example, a determination may be made regarding a play style when a player holds a weak hand in a late table position. A determination may be made that it is not unusual for a player to attempt a raise to steal the blinds in such a situation, and that the likelihood of this tactic increases later in a tournament. Tracking this trend may prevent a valid bluff or semi-bluff action from being confused with two players teaming up against the middle player if the big blind re-raises.

Yet another example of a determination regarding play style may include a determination that one player notices that other players are playing a very tight style of play and in response plays aggressively against them. A further determination may be made that yet another player reacts to the one player's behavior by playing aggressively against the one player. Other players may get caught in the middle of these two aggressive players, however, by tracking the trends of the players, it can be determined that there is not collusion between the aggressive players, rather it is simply their play styles in this particular situation.

Still another example of a determination regarding play style in context may include a determination that a player seems to randomly play very poorly. For example, a player may hold a decent hand and may happen to make a strong hand by drawing to a straight or a flush. However, the player may not realize this and fold the big hand. This on its own could look like collusion, but in the context of previous play by this player, it can be determined that there is not a history of colluding activity and perhaps this is an inexperienced player that simply made a mistake.

Accordingly, for a given player and/or set of situations, any data may be tracked to determine a player profile. A player may be assigned a player type based on that data. Such information may be determined for each situation type desired at any level of granularity so that an expected action of a player is known in any given situation and/or in broad strokes.

Some embodiments may include determining player styles over time. Such information may be determined from player action information recorded in gameplay of one or more games (e.g., from recorded action and/or game information such as that described above). Such player style information may be generic to overall gameplay and/or may be context specific. For example, such information may indicate a general style of play for a player in poker games. As another example, such information may indicate a style of play in a specific situation (e.g., against a specific player, against a type of player, with a given starting hand strength, with a given community hand strength, with a full table, and so on). Such information may indicate a betting trend for a player over time. Such style information may be used to determine collusion action of a player. For example, if a player deviates from a style in an unexplained manner to take an action that seems to be a colluding action, then the player may be determined to likely be engaged in collusion.

As more information is obtained, expectations of player behavior may become more accurate. Some embodiments may need about 30 to about 40 hands of play to form an accurate read of a player. Some more specific or tougher dimensions of player behavior may need more hands for an accurate determination (e.g., about 150 to about 400 hands). Various dimensions may take longer or shorter times that may depend on how often a situation occurs and how specific a dimension is.

Information about one dimension may be used to guess at another dimension. For example, if a player is seen as a tight and aggressive player in some situations, that player may be considered a tight and aggressive player in situations that have not yet occurred. Over time, a system of collusion detection according to some embodiments may become better at guessing the type of person new players will be with less data. The system may learn how to categorize people based on prior categorizations of other people. Over time, a system may determine correlations between play styles in one situation and other situations and use that correlation information to fill in profile information about situations that it does not have information about.

FIG. 7 illustrates an example of player style determination that may be used in some embodiments. In this example, players may be placed into one of nine different style categories that are defined by the historic actions of the players. For example, if a player is loose and aggressive and likes to bluff, the player may be considered a "lion". A lion may be determined by analyzing play actions to find that the player raises pre-flop more than 8% of the time, has an aggression factor greater than 2, and has a voluntarily putting money in the pot chance of less than or equal to 20%. It should be recognized that the various categories shown in FIG. 7 are given as non-limiting examples only. It should further be recognized that the example dimensions used to define the example categories are also given as non-limiting examples only. In various embodiments, any number of categories or no categories at all may be used. In various embodiments, any play style characteristics may be used to determine category information. As illustrated, different categories may use different characteristics for their determination or may use all the same characteristics.

In some embodiments, as that illustrated in FIG. 7, a player style determination may vary based on the context of play. In this example, a player is show to have different style determinations for a full table, a short table, and heads up play. A player may have the same style of play in all situations or other embodiments may include only a single play style determination for all game play. In still other embodiments, the context of play style determination may be more specific. For example, play style may be determined for specific rounds of play (e.g., play style pre flop, play style post flop, etc.), play style may be determined against other player types (e.g., play style against a person that is typically a "lion"), play style may be determined for specific card strengths (e.g., play style when community cards are weak and hold cards are strong), play style may be determined for a specific table position (e.g., big blind, small blind), play style may be determined for a time of day, play style may be determined for a type of game (e.g., tournament, non-tournament), play style may be determined for a level in a tournament, play style may be determined for a chip count (e.g., most chips, least chips, average chips), play style may be determined for any desired situation in any level of specificity as desired.

Determination of game actions, player actions, and/or player styles may be an ongoing element in some embodiments. For example, as new games are played by players, information about those games may be received and stored. That information may be used to update player style information so that over time player style information may be kept up to date to account for player behavioral changes or style evolution. In some embodiments, player action may be given weight based on time. In some embodiments, because player styles may evolve naturally over time, more recent player actions may be given a higher weight in a determination of player styles. For example, some embodiments may ignore information that is greater than six month old (e.g., unless there is no or insufficient recent data). As another example, some embodiments may give full weight to recent data and increasingly diminished weight to more distant data. At some point data may be given no weight (e.g., if there is sufficient information to make the determination without the data). In some embodiments, old data may be used if there is not sufficient information to otherwise make a complete analysis without it (e.g., if a particular situation has not occurred in the last year for a player, then older data than a year old may be used to determine a style in that situation for embodiments that record style information for that situation). Accordingly, sliding updated style information may be maintained for a player that accounts for evolution of play in some embodiments.

Some embodiments may include receiving game information. Such information may be received after a player profile has been determined based on previously received game information. The new game information may be analyzed to determine collusion. Such determination of possible collusion may be made with reference to the prior game information and/or player style information. Accordingly, an ongoing determination of collusion and updating of player style information may be made on new game information.

Some embodiments may include determining possible collusion actions in a game. FIG. 8 illustrates an example data structure that may be used to identify and/or store possible collusion actions in each round of play by each player in a game. For example, a determination may be made if a player is engaged in soft play, chip dumping, squeeze play or shared cards in a particular round based on actions taken in that round or in the game up to that point of the round. Such a determination may or may not take into account player style information. It should be recognized that any forms of collusion and collusion actions or determination may be made in various embodiments and that these are given as non-limiting examples only.

For example, in some embodiments, a chip dumping event may be determined if the player action results in a transfer of chips from one player to another player when the player should not have lost the game (e.g., based on the cards in his or her hands). A soft play may be determined if a player plays in a non-aggressive manner when he should play in an aggressive manner (e.g., based on having good or the best cards in his hand). It should be recognized that these examples are non-limiting and that any form of determining whether an action in a game is a possible collusion action may be used in various embodiments.

As another set of examples, in some embodiments, a chip dumping may be determined to be possible if a player action in a round results in a chip transfer from one player to another because of an action by the player that is not in line with the player's determined style. Similarly, a soft play may be determined if a player makes a passive play in a situation when the player would take a non-passive play according to his determined play style in the situation. It should once again be recognized that these examples of determining collusion with reference to determined player styles are given as non-limiting examples only.

Some embodiments may include determining a collusion rating (e.g., likelihood or severity level). For example, based on the amount of money involved in a collusion action, a level may be greater or lower (e.g., high money involved may mean high severity). As another example, a likelihood level may be based on how drastically divergent from a style or expectation of play an action may be. Such likelihood may further be based on how strong an expectation is (e.g., if the expectation that an action will be taken is strong and it is not taken then the likelihood may be greater, if the player has always taken an action in a given situation but doesn't then it may be higher, if the player only slightly more often than not takes an action in a game but doesn't then the likelihood may be low). A number of collusion actions between a set of people over time may be used to determine likelihood and/or severity (e.g., the more collusion action the greater the likelihood that the players are colluding).

Some embodiments may include determining, for an ongoing table, game or tournament, that collusion continues to be possible based on actions at the table, game, or tournament. For example, as game or table continues more and more possible collusion action may happen and be used to affect a collusion rating for the game, table, tournament, etc.

Some embodiments may include an ongoing collusion rating. Some embodiments may determine total actions and the percentage of those actions that are between a same set of people that are considered collusion actions. For example, some embodiments may determine Y events that might be collusion actions. In some embodiments those determinations may account for historic play styles of players as discussed above. In other embodiments, a number of those collusion actions may be subtracted from this equation based on being accounted for by historical styles (e.g., an analysis may be done to determine which of the Y actions are according to player styles and therefore taken out of the collusion action equation). In still other embodiments, all of the possible collusion actions regardless of conformity to style may be used in such an equation. The Y value may be divided by X total actions to determine a collusion percentage.

Other embodiments may include other collusion ratings over time. For example, collusion severity, collusion likelihood, and so on may be used. Collusion percentage may be one component of a collusion determination and/or the only components. For example, in some embodiments money amounts, percentages of collusion actions, likelihood of collusion, and/or any other factor may be combined and/or used separately to determine a collusion problem.

Some embodiments may include determining that a collusion rating meets some problem threshold indicating that collusion has likely occurred. One or more actions may be taken in response to such a determination. For example, an alert may be made, a regulator may be notified, a player may be banned, a game may be replayed, and so on.

For example, a collusion percentage identifies that the number of collusions divided by the total actions is greater than some threshold percentage (e.g., 1%, 0.001%, 10%, etc.) then collusion may be determined to be likely and an anti-collusion action may be triggered. As another example, in some embodiments, if a severity and/or likelihood rating exceeds some threshold (e.g., 10% likely collusion, high severity such that large amounts of money at a high likelihood is indicated) some action may be triggered. In some embodiments, a relationship between money at risk and likelihood may exist such that a lower threshold of likeliness may be needed for higher dollar amounts. It should be recognized that these examples of triggering an action are given as non-limiting only.

Some embodiments may include displaying information identifying collusion ratings to one or more users of a collusion detection system. For example, an anti-collusion professional may be shown collusion rating information (e.g., likelihood, severity, percentage, an aggregate rating, etc.) for a table, a player, a game, a tournament, and so on. The user may be able to obtain more information to help analyze the collusion.

Figure 9:
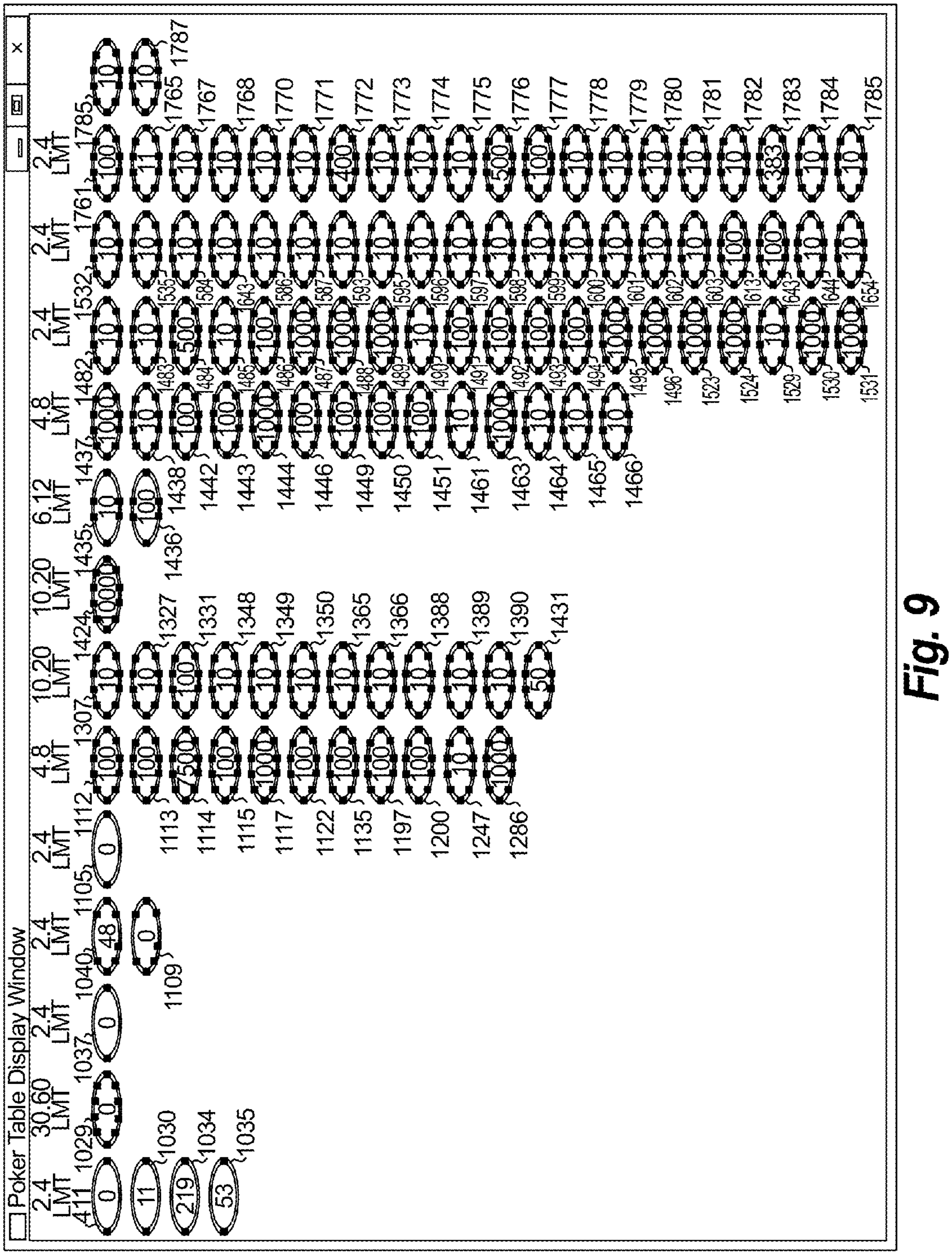
FIG. 9 shows an example interface that may be used to show collusion at various tables according to some embodiments.

FIG. 9 illustrates an example interface that may be used to display collusion information. Such an interface may show a collusion specialist information about ongoing games (e.g., in a tournament or not). A graphical representation of physical or virtual poker tables at which games may be taking place are shown. Tables may be grouped in columns according to limits of the games or other game characteristics. Tables may be numbered to identify them. Tables may show the number of players around them with a dot indicator as shown.

As shown, in the center of each table (or anywhere desired) may be a collusion indicator. The collusion indicator may identify a rating of collusion at the table (e.g., likelihood of collusion, number of collusion events, severity rating of collusion, any other type of collusion rating). The tables may be color-coded based on collusion ratings to help a user identify which tables are likely falling victim to collusion actions.

Figure 10:
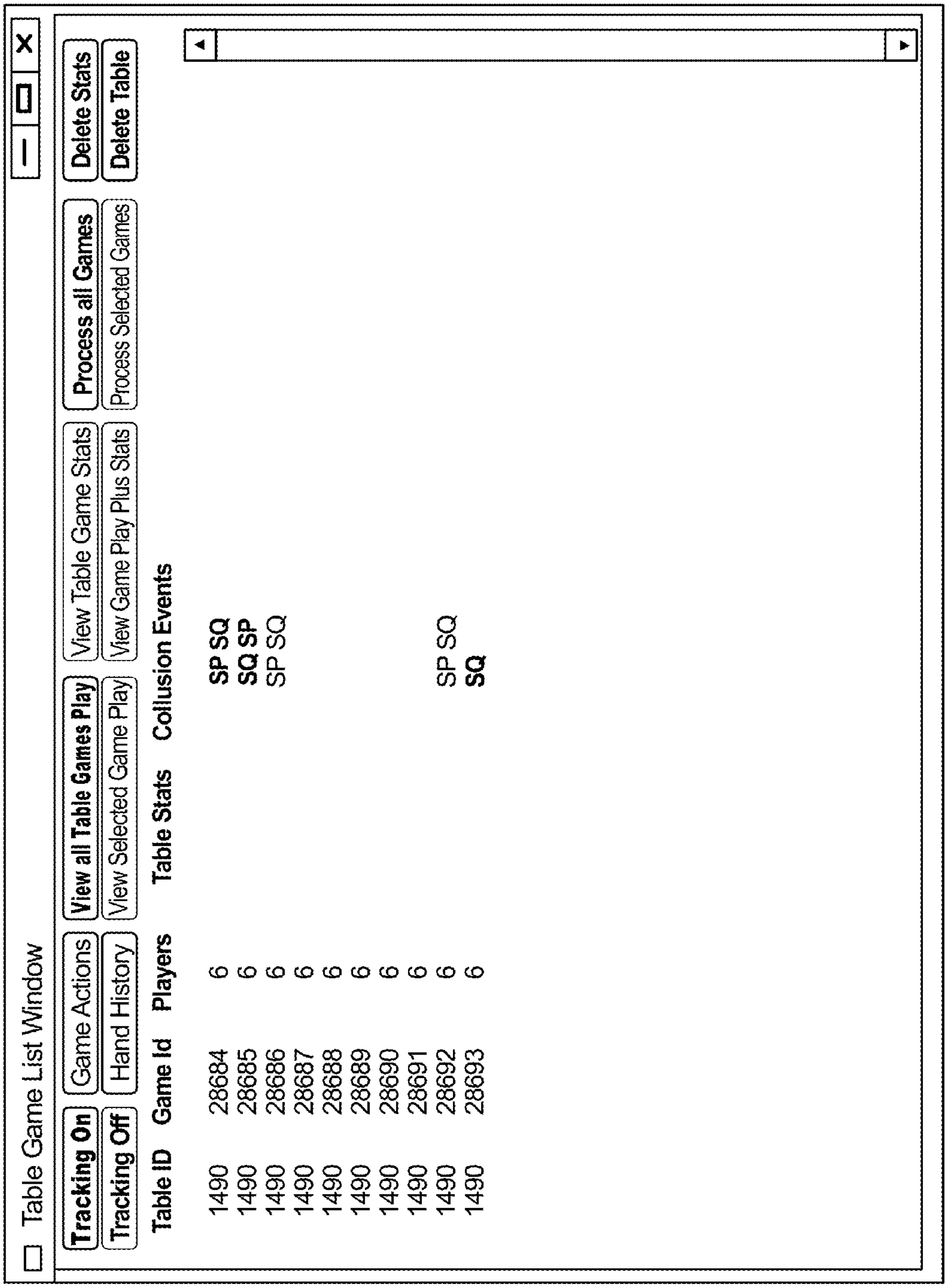
FIG. 10 shows an example interface that may be used to show information about a specific table in some embodiments.

A user of an anti-collusion system may be able to obtain detailed information about one or more games at a table. For example, a user may click on a table in the interface of FIG. 9 to obtain detailed information about that table. FIG. 10 illustrates an example interface that may be used to provide detailed information to a user. The information may identify collusion events that may have occurred at the table during each game played at the table. The information may include detailed information about asset of games that have been played at the table and each collusion event that may have been detected during each of these games. Collusion events in this interface may be color-coded to indicate likelihood and/or severity.

In some embodiments, a user may be able to obtain detailed information about a game and/or collusion event. For example, by clicking on a particular game or collusion event in the interface of FIG. 10, the user may be provided with detailed information about that event and/or game. For example, a user may be shown a replay of an event, statistics tracked about the event, information about prior games and/or events, players in the event, results of the event, historic relevance of the event, actions that took place in the game in which the event took place, table information regarding the event, player relationships that have been observed between players involved in the event, information that may have been used to make the collusion determination of the event, and/or any other desired information. Information may be sorted or displayed in any order, such as sorted in order of its importance, in order of time, and so on.

Figure 11A:
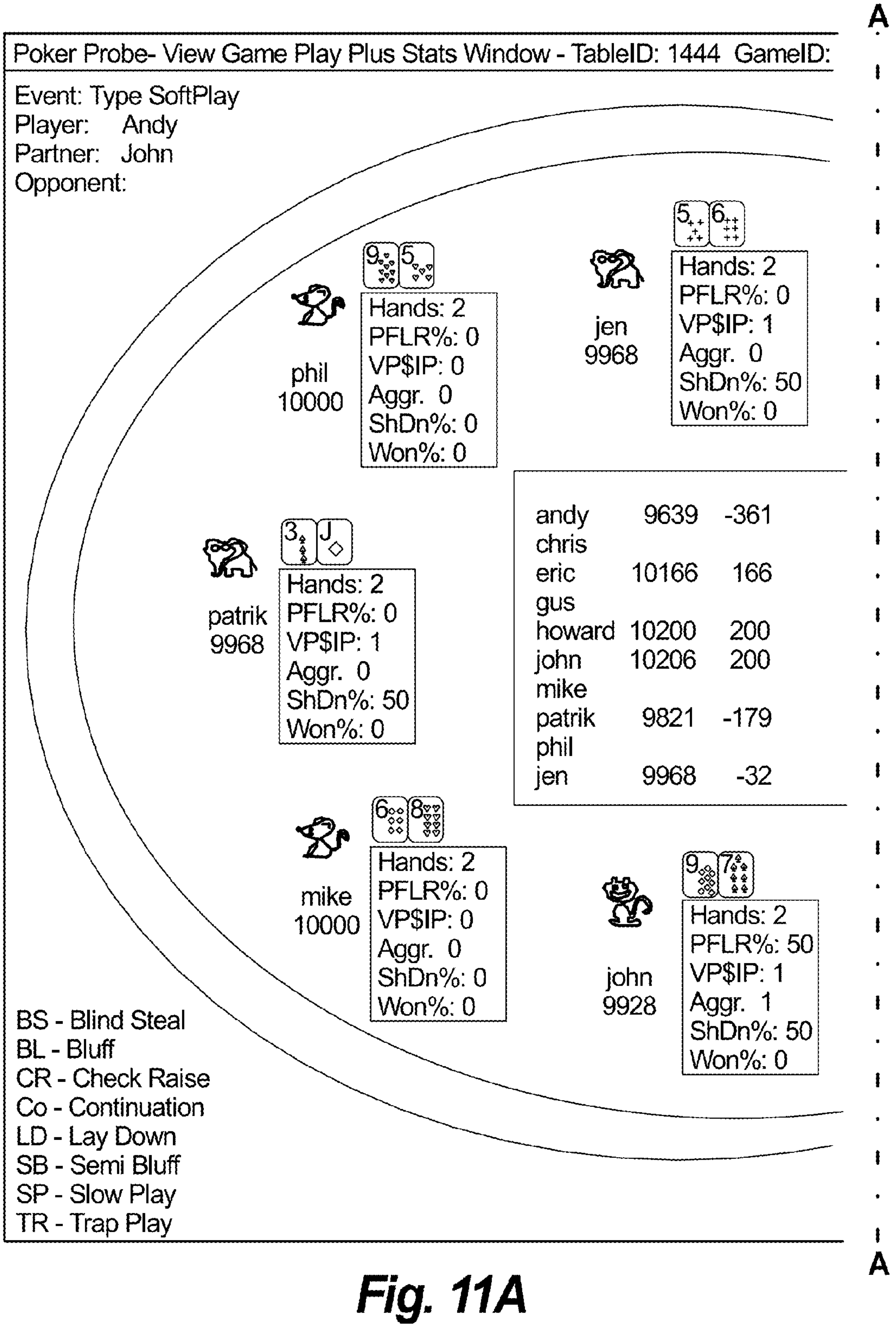
FIG. 11 (in parts, A and B) shows an example interface that may be used to show specific event information about a possible collusion according to some embodiments.
Figure 11B:
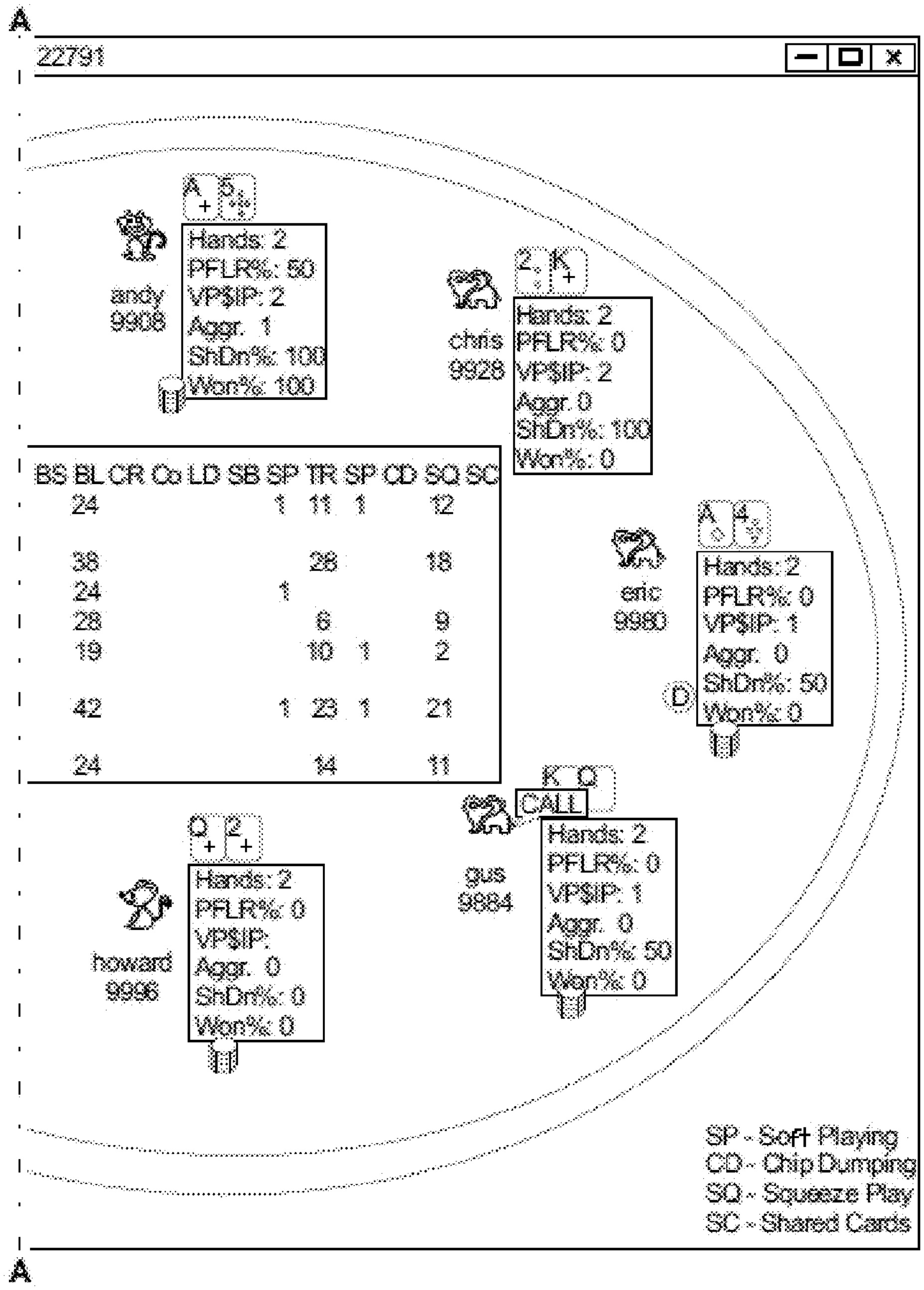

FIG. 11 illustrates one example interface that may be used to display game and/or event information to a user. This interface may display information about a collusion event, other events, a game in which a collusion event occurred, other games, and so on. Any information or game that the user chooses to help investigate collusion may be displayed through such an interface.

As illustrated, an event type and players involved in the event may be displayed through such an interface. In this example, a soft play collusion event has been detected because John bet some amount and Gus, with a strong hand checked rather than raised as his hand would warrant. This determination may have been made because typically one would raise in this situation and/or because Gus has historically raised in similar situations.

Information about each player's play style may be shown. For example, in the illustrated interface, the avatar of each player is shown to indicate a paly style of the player in this particular situation. The play styles may correspond to the categories of FIG. 7. Further, as illustrated, detailed information about each player may be shown, such as number of hands dealt, percent of time a player raises pre-flop or takes any other action in a given situation, frequency of number of times player voluntarily puts money in the pot, aggression factor based on number of times player raised compared to number of times player called, percent of time player went to show down, percent of time player won (or possibly split a pot), and so on. Each such statistic may be an at large statistic and/or a statistic that is relevant to a particular situation at any level of desired granularity (e.g., with a hand in the pocket hand strength category, with the specific pocket cards, against players of these styles, and so on). Information about collusion events and/or play events at a table may be shown in some embodiments. For example, in the illustrated interface, the number of collusion events that have been detected and certain play actions are shown in a center grid. Any information may be shown as desired.

This information may be used to determine collusion. For example, a user may view this information and make an assessment as to whether collusion has occurred or not. The user, in some embodiments, may be a state regulator assigned to monitor collusion. In other embodiments, the user may be a collusion expert assigned to maintain integrity of a gaming environment. Any information desired by the user may be recorded and displayed through an interface to enable the user to make a decision regarding whether collusion has occurred or not.

In some embodiments, a user of such a system may control a system to take a desired anti-collusion action. For example, a player may be banned, game play may be halted, an investigation may be conducted, authorities may be notified, a game may be replayed, results may be invalidated, players may be removed from a tournament, players may be prevented from future paring in a game, and so on. It should be recognized that anti-collusion actions are given as non-limiting examples only and that other embodiments may include any desired anti-collusion actions.

Although some examples have been described in terms of a collusion expert monitoring for collusion activity, it should be recognized that those examples are non-limiting examples only. Some embodiments may include an automated anti-collusion system in which based on determined player actions an anti-collusion action is taken automatically and/or recommended to a user for confirmation. Some examples of such a system are discussed herein already. As one further example, some embodiments may include a system whereby based on a collusion rating (e.g. likelihood of collusion, severity of collusion, and/or number of collusion actions), one or more actions may be taken. For example, if likelihood of collusion is high (e.g., 90% likely, 99% likely, 95% likely, etc.), then a player may be banned automatically. If severity of collusion is high (e.g., $10,000 wager, an all in wager being part of the game, a table max bet, $1,000 wager, any threshold wager level) and likelihood is moderate (e.g., 40% likely, 60% likely, etc.), then a game may be caused to be replayed. If a number or percentage of collusion action involving two players reaches some threshold (e.g., 10% colluding actions, 1% colliding actions, 0.5% colluding actions, 0.1% colluding actions, etc.), then the players may be prevented from playing together in the future. It should be recognized that any set of thresholds applying any input collusion ratings to trigger any desired action may be implemented as desired.

Some embodiments may include an expert system that may learn player behavior recognition and/or collusion action triggering over time. For example, such a system may include a rule based system. Such a system may implement a Bayesian belief network. Such a system may be programmed in a LISP derivative such as CLIPS.

For example, such a system may begin with an initial set of thresholds for determining player styles and/or triggering anti-collusion actions (e.g., as discussed above with respect to high likelihood, high severity, % of time voluntarily put money in the pot, and so on). Such a system may begin with an initial set of relationships between these thresholds and input information. The relationships and/or thresholds may change over time. For example, a threshold of likelihood before a triggered action happens may decrease over time. Such a decrease may happen in response to the system determining or being told that it is not catching collusion actions (e.g., because a user may cause the action to trigger in a hybrid auto/manual system). Over time the manual aspect of such a system may decrease as the expert system learns to catch collusion actions more in line with how the expert collusion user detects the collusion actions. Similarly, the expert system may implement new rules or relationships that explain why an expert user has triggered an action (e.g., may implement a rule that triggers based on an otherwise unexpected relationship such as based on table position when it is thought originally that table position does not affect collusion but table position explains why an expert user is triggering an anti-collusion caution). Determinations of regulators may be used as input to such an expert system for the development of new rules (e.g., if regulators determine when to trigger actions, if regulators determine that an action was collusive, and so on a relationship may be established to account for such a determination). Determinations that an incorrect collusion action was taken may be used as input to further train such an expert system (e.g., if the system itself makes the determination and is later shown to be wrong the system may adjust its rules, if a user of the system makes an incorrect determination that information may also be used to train the system). It should be recognized that various examples of machine learning are given as non-limiting examples only and that other embodiments may include any artificial intelligence components (e.g., neural networks, genetic algorithms, etc.) or no such components as desired.

Some embodiments may include a collusion detection system implemented through one or more computing devices. Such a computing device may include any number of machine readable medium (e.g., on which data structures and/or instructions may be stored), any number of processors, modules, engines, servers, network interface, blades, terminals, connected devices, and/or components as desired in any combination. For example, such a system may be part of a gaming system through which users may play wagering games (e.g. through mobile devices, through computing devices, at physical locations, etc.). Data may be received by the system (e.g., through a network, captured via camera, input by users, determined by a processor of a gaming system, and so on). For example, in some embodiments, events at a game may be determined by a gaming event engine of a gaming system. Such events may be shown to players accessing the system through remote devices and recorded by a collusion detection engine of the gaming system. Actions by players may be taken through device used to play games. The actions may be received by the gaming system through a network and used to move the game forward by interaction with a gaming engine. The actions may be recorded and/or analyzed by a collusion detection engine. A collusion detection engine may control a gaming service and/or terminal to take an action and/or display information related to determined collusion actions. It should be recognized that various examples of systems and/or components are given as non-limiting examples and that embodiments may be implemented on any desired devices. For example, various functionality to play a game and/or detect collusion in a game may be implemented across any number of computing devices operated by a same or different entities (e.g., a regulator may run a collusion system, a game provider may run a gaming system; a gaming provider may run both; a collusion service provider may run a collusion system for a gaming provider that runs the collusion system, and so on).

Figure 12:
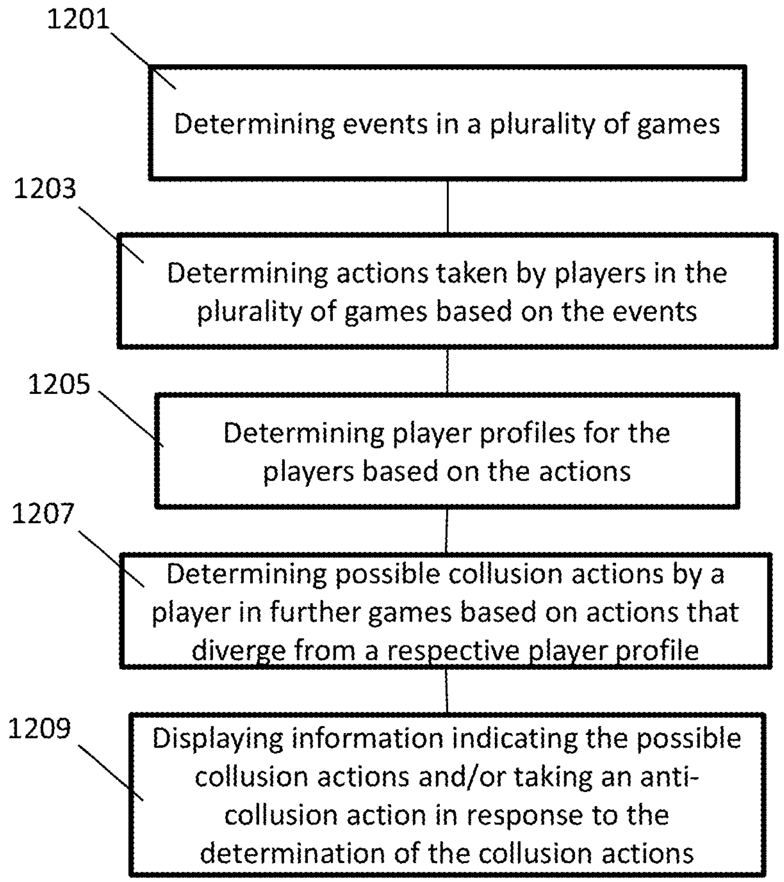
FIG. 12 shows an example method that may be performed in some embodiments.

Some embodiments may include a method that may be performed (e.g. by a computing device). FIG. 12 illustrates one example method that may be performed in some embodiments. Such a method may include determining events in a plurality of games, determining actions taken by players in the plurality of games based on the events, determining player profiles for the players based on the actions, determining possible collusion actions by a player in further games based on actions that diverge from a respective player profile, and displaying information indicating the possible collusion actions and/or taking an anti-collusion action in response to the determination of the collusion actions.

As indicated at block 1201, some embodiments may include determining events in a plurality of games. For example, game actions, game outcomes, cards dealt, and so on may be received for a plurality of games. Various examples of game information are given herein. Such information may be stored and/or processed as desired.

As indicated at block 1203, some embodiments may include determining actions taken by players in the plurality of games based on the events. For example, bluff actions, raise actions, soft play actions and so on may be determined based on events that happen in a game (e.g., including things done by the player in the game). Things done by a player may be put into context based on the states of the game. Various examples of player actions that may be determined are given herein. Such information may be stored and/or processed as desired.

As indicated at block 1205, some embodiments may include determining player profiles for the players based on the actions. For example, any behavioral profile of a player with any degree of specificity may be determined. Various examples of behavioral patterns that may be determined are given herein. As an example, some embodiments may include determining a player category for each of a set of possible play situations for each player. As another example, some embodiments may include determining statistics of a percentage of time a player takes various actions in specific situations. Such information may be stored and/or processed as desired.

As indicated at block 1207, some embodiments may include determining possible collusion actions by a player in further games based on actions that diverge from a respective player profile. Various examples of determining collusion actions based on profile information are described herein. For example, some embodiments may include determining that an action is a possible collusion action because is typical collusive behavior and is against a player typical behavior in a given situation (e.g., most of the time the player does not take that action, 75% of the time the player does not take that action, a plurality of time the player takes a different type of action, the player has never taken that action in the situation before, etc.). Some embodiments may count on going collusion actions and develop an ongoing collusion rating for a game, table, tournament, and soon based on continued monitoring of game play. Some embodiments may include providing some rating level to a possible collusion action such as a severity, a likelihood, a trend or pattern based on ongoing collusion action counts, and so on.

As indicated at block 1209, some embodiments may include displaying information indicating the possible collusion actions and/or taking an anti-collusion action in response to the determination of the collusion actions. Various examples of display interfaces that may be provided to present such information are described herein. Various examples of actions that may be taken in response to different collusion action determinations are described herein. For example, based on a collusion rating reaching some threshold level for a table, game play at the table may be halted.

It should be recognized that the example method is given as a non-limiting examples only and that other embodiments may include different, or no methods with differently ordered, more, fewer, different, same, similar, and so on actions as desired.

It should be recognized that while various examples of functionality and implementations have been described, that these examples are given as non-limiting examples only. Other embodiments may include some, none, or all of these examples in any combination as desired.

It should be recognized that while examples are given in terms of a texas hold'em poker game that other embodiments are not so limited. For example, other embodiments may include a Chinese poker game, a stud or draw poker game, and/or any form of poker. It should further be recognized that while some embodiments are given in terms of a poker game that other embodiments may include any card game. For example, some embodiments may include a baccarat game, a blackjack game and/or any desired card game. It should be recognized that while some embodiments may be given in terms of a card game that other embodiments may include a game of any type. For example, some embodiments may include a mahjong game a dominos game and/or any other card or non-card game.

In a non-texas hold'em embodiment, different types of play may be monitored that may be appropriate to the game, different trigger or decision points that may be appropriate to the game may be used, different actions may be monitored that are actions that could be taken in the game, and so on. It should be recognized that texas hold'em poker is given as an example because of the many example actions and collusion types that may be found in such a game. One of ordinary skill in the art will recognize how such various examples may apply to one or more other game types based on the rules of such other game types.

A system that monitors collusion and takes collusion prevention actions may includes a system that operates a gaming system. For example, a tournament gaming engine operated by Cantor Gaming may have an associated collusion detection module that runs on a same or different computing device. Accordingly information about game play may be monitored by communication between such systems. Those systems may be separate or run by different entities as desired in various embodiments so that a collusion module may be operated together or remotely from a gaming platform as desired. The following sections provide a guide to interpreting the present application.

II. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

III. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

IV. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

V. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites. No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

VI. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth□, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VII. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VIII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

IX. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

X. Incorporation by Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

XI. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XII. Cards

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards. Other types of playing cards are described herein, but it should be recognized that various topics may apply to any, some, and/or all type of playing cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XIII. Rules of Card Games

Rules of Poker

In a basic poker game, which is played with a standard 52-card deck, each player is dealt five cards. All five cards in each player's hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player's hand. Regardless of the number of cards in a player's hand, the values assigned to the cards, and the odds, the method of evaluating all five cards in a player's hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a 'dealer' button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players' hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker

Players each receive five—as in five-card draw—or more cards, all of which are hidden. They can then replace one or more of these cards a certain number of times.

Stud Poker

Players receive cards one at a time, some being displayed to other players at the table. The key difference between stud and 'draw' poker is that players are not allowed to discard or replace any cards.

Community Card Poker

Players combine individually dealt cards with a number of "community cards" dealt face up and shared by all players. Two or four individual cards may be dealt in the most popular variations, Texas hold'em and Omaha hold'em, respectively.

Poker Hand Rankings

Straight Flush

A straight flush is a poker hand such as Q♠ J♠ 10♠ 9♠ 8♠, which contains five cards in sequence, all of the same suit. Two such hands are compared by their high card in the same way as are straights. The low ace rule also applies: 5♦ 4♦ 3♦ 2♦ 1♦ is a 5-high straight flush (also known as a "steel wheel"). An ace-high straight flush such as A♣ K♣ Q♣ J♣ 10♣ is known as a royal flush, and is the highest ranking standard poker hand (excluding five of a kind).

Examples

7♥ 6♥ 5♥ 4♥ 3♥ beats 5♠ 4♠ 3♠ 2♠ A♠

J♣ 10♣ 9♣ 8♣ 7♣ ties J♦ 10♦ 9♦ 8♦ 7♦

Four of a Kind

Four of a kind, or quads, is a poker hand such as 9♣ 9♠ 9♦9♥J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Examples

10♣ 10♦ 10♥ 10♠ 5♦ ("four tens" or "quad tens") defeats 6♦ 6♥ 6♠ 6♣ K♠ ("four sixes" or "quad sixes")

10♣ 10♦ 10♥ 10♠ Q♣ ("four tens, queen kicker") defeats 10♣ 10♦ 10♥ 10♠ 5♦ ("four tens with a five")

Full House

A full house, also known as a boat or a full boat, is a poker hand such as 3♣ 3♠ 3♦ 6♣ 6♥ which contains three matching cards of one rank, plus two matching cards of another rank. It ranks below a four of a kind and above a flush. Between two full houses, the one with the higher ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

Examples

10♠ 10♥ 10♦ 4♠ 4♦ ("tens full") defeats 9♥ 9♣ 9♠ A♥ A♣ ("nines full")

K♠ K♣ K♥ 3♦ 3♠ ("kings full") defeats 3♠ 3♥ 3♦ K♠ K♦ ("threes full")

Q♥ Q♦ Q♣ 8♥ 8♣ ("queens full of eights") defeats Q♥ Q♦ Q♣ 5♠ 5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in "queen-high flush".

Examples

A♥ Q♥ 10♥ 5♥ 3♥ ("ace-high flush") defeats K♠ Q♠ J♠ 9♠ 6♠ ("king-high flush")

A♦ K♦ 7♦ 6♦ 2♦ ("flush, ace-king high") defeats A♥ Q♥ 10♥ 5♥ 3♥ ("flush, ace-queen high")

Q♥ 10♥ 9♥ 5♥ 2♥ ("heart flush") ties Q♠ 10♠ 9♠ 5♠ 2♠ ("spade flush")

Straight

A straight is a poker hand such as Q♣ J♠ 10♠ 9♥ 8♥, which contains five cards of sequential rank, of varying suits. It ranks above three of a kind and below a flush. Two straights are ranked by comparing the high card of each. Two straights with the same high card are of equal value, and split any winnings (straights are the most commonly tied hands in poker, especially in community card games). Straights are described by the highest card, as in "queen-high straight" or "straight to the queen".

A hand such as A♣ K♣ Q♦ J♠ 10♠ is an ace-high straight, and ranks above a king-high straight such as K♥ Q♠ J♥ 10♥ 9♦. But the ace may also be played as a 1-spot in a hand such as 5♠ 4♦ 3♦ 2♠ A♣, called a wheel or five-high straight, which ranks below the six-high straight 6♠ 5♣ 4♣ 3♥ 2♥. The ace may not "wrap around", or play both high and low in the same hand: 3♣ 2♦ A♠ K♣ Q♣ is not a straight, but just ace-high no pair.

Examples

8♠ 7♠ 6♥ 5♥ 4♠ ("eight-high straight") defeats 6♦ 5♠ 4♦ 3♥ 2♣ ("six-high straight")

8♠ 7♠ 6♥ 5♥ 4♠ ties 8♥ 7♦ 6♣ 5♣ 4♥

Three of a Kind

Three of a kind, also called trips, set or a prile, is a poker hand such as 2♦ 2♠ 2♥ K♠ 6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

Examples

8♠ 8♥ 8♦ 5♠ 3♣ ("three eights") defeats 5♣ 5♥ 5♦ Q♦ 10♣ ("three fives")

8♠ 8♥ 8♦ A♣ 2♦ ("three eights, ace kicker") defeats 8♠ 8♥ 8♦ 5♠ 3♣ ("three eights, five kicker")

Two Pair

A poker hand such as J♥ J♣ 4♣ 4♠ 9♠, which contains two cards of the same rank, plus two cards of another rank (that match each other but not the first pair), plus one unmatched card, is called two pair. It ranks above one pair and below three of a kind. Between two hands containing two pair, the higher ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♣) and the lower pair (e.g., 9♠ 9♦), as in "Kings over nines", "Kings and nines" or simply "Kings up".

Examples

K♥ K♦ 2♣ 2♦ J♥ ("kings up") defeats J♦ J♠ 10♣ 10♣ 9♠ ("jacks up")

9♣ 9♠ 7♦ 7♠ 6♥ ("nines and sevens") defeats 9♥ 9♠ 5♥ 5♦ K♣ ("nines and fives")

4♠ 4♣ 3♠ 3♥ K♦ ("fours and threes, king kicker") defeats 4♥ 4♦ 3♦ 3 10♠ ("fours and threes with a ten")

One Pair

One pair is a poker hand such as 4♥ 4♠ K♠ 10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

Examples

10♣ 10♠ 6♠ 4♥ 2♥ ("pair of tens") defeats 9♥ 9♣ A♥ Q♦ 10♦ ("pair of nines")

10♥ 10♦ J♦ 3♥ 2♣ ("tens with jack kicker") defeats 10♣ 10♠ 6♠ 4♥ 2♥, ("tens with six kicker")

2♦ 2♥ 8♠ 5♣ 4♣ ("deuces, eight-five-four") defeats 2♣ 2♠ 8♣ 5♥ 3♥ ("deuces, eight-five-three")

High Card

A high-card or no-pair hand is a poker hand such as K♥ J♣ 8♣ 7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest ranking card; if those are equal, then the next highest ranking card; if those are equal, then the third highest ranking card, etc. No-pair hands are described by the one or two highest cards in the hand, such as "king high" or "ace-queen high", or by as many cards as are necessary to break a tie.

Examples

A♦ 10♦ 9♠ 5♣ 4♣ ("ace high") defeats K♣ Q♦ J♠ 8♥ 7♥ ("king high")

A♣ Q♣ 7♦ 5♥ 2♣ ("ace-queen") defeats A♦ 10♦ 9♠ 5♣ 4♣ ("ace-ten")

7♠ 6♣ 5♣ 4♦ 2♥ ("seven-six-five-four") defeats 7♣ 6♠ 5♦ 3♥ 2♣ ("seven-six-five-three")

Decks Using a Bug

The use of joker as a bug creates a slight variation of game play. When a joker is introduced in standard poker games it functions as a fifth ace, or can be used as a flush or straight card (though it can be used as a wild card too). Normally casino draw poker variants use a joker, and thus the best possible hand is five of a kind, as in A♥ A♦ A♣ A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that may qualify. As the dealer's hand is partially concealed during play (usually only one card, at most) is displayed to the player before player wagering is complete), the player may always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the wager, take precisely one more card and then "stand." When a player has identical value cards, such as a pair of 8s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer may hit until he has a point total of at least 17, regardless of what the players have. In most casinos, the dealer may also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural" (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

XIV. Tracking the Action at a Table

U.S. Pat. No. 6,579,181 generally describes, "a system for automatically monitoring playing and wagering of a game. In one illustrated embodiment, the system includes a card deck reader that automatically reads a respective symbol from each card in a deck of cards before a first one of the cards is removed from the deck. The symbol identifies a value of the card in terms of rank and suit, and can take the form of a machine-readable symbol, such as a bar code, area or matrix code or stacked code. In another aspect, the system does not decode the read symbol until the respective card is dealt, to ensure security.

"In another aspect, the system can include a chip tray reader that automatically images the contents of a chip tray. The system periodically determines the number and value of chips in the chip tray from the image, and compares the change in contents of the chip tray to the outcome of game play to verify that the proper amounts have been paid out and collected.

"In a further aspect, the system can include a table monitor that automatically images the activity or events occurring at a gaming table. The system periodically compares images of the gaming table to identify wagering, as well as the appearance, removal and position of cards and/or other objects on the gaming table. The table monitoring system can be unobtrusively located in the chip tray."

U.S. Pat. No. 6,579,181 generally describes "a drop box that automatically verifies an amount and authenticity of a deposit and reconciles the deposit with a change in the contents of the chip tray. The drop box can image different portions of the deposited item, selecting appropriate lighting and resolutions to examine security features in the deposited item.

"In another aspect, the system can employ some, or all of the components to monitor the gaming habits of players and the performance of employees. The system can detect suspect playing and wagering patterns that may be prohibited. The system can also identify the win/loss percentage of the players and the dealer, as well as a number of other statistically relevant measures. Such measures can provide a casino or other gaming establishment with enhanced automated security, and automated real-time accounting. The measures can additionally provide a basis for automatically allocating complimentary benefits to the players."

Various embodiments include an apparatus, method and system which utilizes a card dispensing shoe with scanner and its associated software which enable the card dealer when dealing the game from a card dispensing shoe with scanner preferably placed on a game table where the twenty-one game to be evaluated by the software is being played, to use one or more keyboard(s) and/or LCD displays coupled to the shoe to identify for the computer program the number of the active players' seats, or active players, including the dealer's position relative thereto and their active play at the game table during each game round dealt from the shoe. These keyboards and LCD displays are also used to enter other data relevant to each seat's, or player's, betting and/or decision strategies for each hand played. The data is analyzed by a computer software program designed to evaluate the strategy decisions and betting skills of casino twenty-one, or blackjack players playing the game of blackjack during real time. The evaluation software is coupled to a central processing unit (CPU) or host computer that is also coupled to the shoe's keyboard(s) and LCD displays. The dealer using one or more keyboard(s) attached to or carried by the shoe, or a keyboard(s) located near the dealer is able to see and record the exact amount bet by each player for each hand played for the game to be evaluated. The optical scanner coupled to the CPU reads the value of each card dealt to each player's hand(s) and the dealer's hand as each card is dealt to a specific hand, seat or position and converts the game card value of each card dealt from the shoe to the players and the dealer of the game to a card count system value for one or more card count systems programmed into the evaluation software. The CPU also records each players decision(s) to hit a hand, and the dealer's decision to hit or take another card when required by the rules of the game, as the hit card is removed from the shoe. The dealer uses one or more of the keyboards and LCD displays carried by the shoe to record each player's decision(s) to Insure, Surrender, Stand, Double Down, or Split a hand. When the dealer has an Ace or a Ten as an up-card, he/she may use one or more of the keyboards to prompt the computer system's software, since the dealer's second card, or hole-card, which is dealt face down, has been scanned and the game card value thereof has been imported into the computer systems software, to instantly inform the dealer, by means of one or more of the shoe's LCDs, if his/her game cards, or hand total, constitutes a two-card "21" or "Blackjack".

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe, for evaluating information relative to each players received playing cards and their values with information as to playing tactics used by each player relative to the values of the received playing cards, and for combining all of this information for identifying each player's playing strategy, and a playing table coupled to the card delivery shoe apparatus and having at least one keypad means located thereon for permitting at least one player to select various card playing options to wager upon.

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying such of the playing cards received by each player from the shoe apparatus, for evaluating information relative to each player's received playing cards and their values with information as to betting tactics used by each player relative to playing cards previously dealt out from the shoe apparatus providing card count information, and for combining all of this information for identifying each player's card count strategy, and a playing table coupled to the card delivery shoe apparatus and having at least one keypad means located thereon for permitting the at least one player to select at least one of various card playing options to wager upon.

In various embodiments, a card playing system for playing a card game which includes a card delivery shoe apparatus for use in dealing playing cards to at least one player for the playing of a card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe apparatus, for evaluating information relative to each player's received playing cards and their values with information as to playing tactics used by each player relative to the values of the received playing cards, for combining use of all of this information for identifying each player's playing strategy, and for also identifying each player's card count strategy based on each player's betting tactics used by each player relative to playing cards previously dealt out from the shoe apparatus providing card count information, and a playing table coupled to the card delivery shoe apparatus and having at least one keypad means located thereon for permitting the at least one player to select at least one of various card playing options to wager upon.

In various embodiments, a secure game table system, adapted for multiple sites under a central control, allows for the monitoring of hands in a progressive live card game. A live card game has at least one deck, with each deck having a predetermined number of cards. Each game table in the system has a plurality of player positions with or without players at each position and a dealer at a dealer position.

In one embodiment, for providing additional security, a common identity code is located on each of the cards in each deck. Each deck has a different common identity code. A shuffler is used to shuffle the decks together and the shuffler has a circuit for counting of the cards from a previous hand that are inserted into the shuffler for reshuffling. The shuffler circuit counts each card inserted and reads the common identity code located on each card. The shuffler circuit issues a signal corresponding to the count and the common identity code read. The game control (e.g., the computer) located at each table receives this signal from the shuffler circuit and verifies that no cards have been withdrawn from the hand by a player (or the dealer) or that no new cards have been substituted. If the count is not proper or if a game card lacks an identity code or an identity code is mismatched, an alarm signal is generated indicating that a new deck of cards needs to be used and that the possibility of a breach in the security of the game has occurred.

In yet another embodiment of security, a unique code, such as a bar code, is placed on each card and as each card is dealt by the dealer from a shoe, a detector reads the code and issues a signal to the game control containing at least the value and the suit of each card dealt in the hand. The detector may also read a common identity deck code and issue that as a signal to the game control. The shoe may have an optical scanner for generating an image of each card as it is dealt from the shoe by the dealer in a hand. The game control stores this information in a memory so that a history of each card dealt from the shoe in a hand is recorded.

In yet another embodiment of security, an integrated shuffler/shoe obtains an optical image of each card dealt from the shoe for a hand and for each card inserted into the shuffler after a hand. These images are delivered to the game control where the images are counted and compared. When an irregular count or comparison occurs, an alarm is raised. The shuffler and shoe are integrated to provide security between the two units.

In another embodiment of security for a live card game, a game bet sensor is located near each of the plurality of player positions for sensing the presence of a game bet. The game bet sensor issues a signal counting the tokens placed. It is entirely possible that game bet sensors at some player positions do not have bets, and therefore, the game control that is receptive of these signals identifies which player positions have players placing game bets. This information is stored in memory and becomes part of the history of the game.

In another embodiment of security, a progressive bet sensor is located at each of the plurality of player positions and senses the presence of a progressive bet. The progressive bet sensor issues a signal that is received by the game control, which records in memory the progressive bets being placed at the respective player position sensed. If a progressive bet is sensed and a game bet is not, the game control issues an alarm signal indicating improper betting. At this point, the game control knows the identity of each player location having placed a game bet and, of those player positions having game bets placed, which player positions also have a progressive bet. This is stored in memory as part of the history of the hand.

In yet another embodiment of security, a card sensor is located near each player position and the dealer position. The card sensor issues a signal for each card received at the card sensor. The game control receives this issued signal and correlates those player positions having placed a game bet with the received cards. In the event a player position without a game bet receives a card or a player position with a game bet receives a card out of sequence, the game control issues an alarm. This information is added to the history of the game in memory, and the history contains the value and suit of each card delivered to each player position having a game bet.

A progressive jackpot display may be located at each game table and may display one or more jackpot awards for one or more winning combinations of cards. In one embodiment of the present invention, the game control at each table has stored in memory the winning combinations necessary to win the progressive jackpots. Since the game control accurately stores the suit and value of each card received at a particular player position, the game control can automatically detect a winning combination and issue an award signal for that player position. The dealer can then verify that that player at that position indeed has the correct combination of cards. The game control continuously updates the central control interconnected to all other game tables so that the central control can then inform all game tables of this win including, if desirable, the name of the winner and the amount won.

The central control communicates continuously with each game control and its associated progressive jackpot display may receive over a communication link all or part of the information stored in each game control.

Various embodiments include a card shoe with a device for automatic recognition and tracking of the value of each gaming card drawn out of the card shoe in a covered way (face down).

Various embodiments include a gaming table with a device for automatic recognition of played or not played boxes (hands), whereby it has to realize multiple bets on each hand and the use of insurance lines. Further more, the gaming table may include a device to recognize automatically the number of cards placed in front of each player and the dealer.

Various embodiments include the recognition, tracking, and storage of gaming chips.

In various embodiment, an electronic data processing (EDP) program may process the value of all bets on each box and associated insurance line, control the sequence of delivery of the cards, control the distribution of the gaming cards to each player and the dealer, may calculate and compare the total score of each hand and the dealer's, and may evaluate the players' wins.

Gaming data may then be processed by means of the EDP program and shown simultaneously to the actual game at a special monitor or display. Same data may be recalled later on to monitor the total results whenever requested.

Various embodiments include a gaming table and a gaming table cloth arranged on the gaming table, the gaming table cloth provided with betting boxes and areas designated for placement of the gaming chips and other areas designated for placement of the playing cards, a card shoe for storage of one or more decks of playing cards, this card shoe including means for drawing individual ones of the playing cards face down so that a card value imprint on the drawn card is not visible to a player of the game of chance, a card recognition means for recognizing this card value imprint on the drawn card from the card shoe, this card recognition means being located in the card shoe, an occupation detector unit including means for registering a count of gaming chips placed on the designated areas and another count of playing cards placed on the other designated areas on the table cloth, this occupation detector unit being located under the table cloth and consisting of multiple single detectors allocated to each betting box, each area for chips and each other area for playing cards respectively, a gaming bet detector for automatic recognition or manual input of gaming bets, and a computer including means for evaluating the play of the game of chance according to the rules of the game of chance, means for storing results of the play of the game of chance and means for displaying a course of the play of the game of chance and the results from electronic signals input from the gaming bet detector, the occupation detector unit and the card recognition means.

According to various embodiments, the card recognition means comprises an optical window arranged along a movement path of the card image imprint on the playing card drawn from the card shoe; a pulsed light source for illuminating a portion of the drawn playing card located opposite the optical window; a CCD image converter for the portion of the drawn playing card located opposite the optical window; an optical device for deflecting and transmitting a reflected image of the card value imprint from the drawn playing card to the CCD image converter from that portion of the drawn playing card when the drawn card is exactly in a correct drawn position opposite the optical window; and sensor means for detecting movement of the drawn card and for providing a correct timing for operation of the pulsed light source for transmission of the reflected image to the CCD image converter. The optical device for deflecting and transmitting the reflected image can comprise a minor arranged to deflect the reflected image to the CCD image converter. Alternatively, the optical device for deflecting and transmitting the reflected image comprises a reflecting optical prism having two plane surfaces arranged at right angles to each other, one of which covers the optical window and another of which faces the CCD image converter and comprises a minor, and the pulsed light source is arranged behind the latter plane surface so as to illuminate the drawn card when the drawn card is positioned over the optical window. Advantageously the sensor means for detecting movement of the drawn card and for providing a correct timing comprises a single sensor, preferably either a pressure sensor or a photoelectric threshold device, for sensing a front edge of the drawn card to determine whether or not the drawn card is being drawn and to activate the CCD image converter and the pulsed light source when a back edge of the drawn card passes the sensor means. Alternatively, the sensor means can include two electro-optical sensors, one of which is located beyond a movement path of the card image imprint on the drawn playing card and another of which is located in a movement path of the card image imprint on a drawn playing card. The latter electro-optical sensor can includes means for activating the pulsed light source by sensing a color trigger when the card value imprint passes over the optical window. In preferred embodiments of the card shoe the pulsed light source comprises a Xenon lamp.

In various embodiments of the gaming apparatus the single detectors of the occupation detector unit each comprise a light sensitive sensor for detection of chips or playing cards arranged on the table cloth over the respective single detector. Each single detector can be an infrared sensitive photodiode, preferably a silicon photodiode. Advantageously the single detectors can be arranged in the occupation detector unit so that the chips or playing cards placed over them on the table cloth are arrange over at least two single detectors.

The gaming apparatus may includes automatic means for discriminating colored markings or regions on the chips and for producing a bet output signal in accordance with the colored markings or regions and the number of chips having identical colored markings or regions.

The gaming bet detector may include automatic means for discriminating between chips of different value in the game of chance and means for producing a bet output signal in accordance with the different values of the chips when the chips are bet by a player. In various embodiments the gaming bet detector includes a radio frequency transmitting and receiving station and the chips are each provided with a transponder responding to the transmitting and receiving station so that the transponder transmits the values of the bet chips back to the transmitting and receiving station.

The connection between the individual units of the gaming apparatus and the computer can be either a wireless connection or a cable connection.

XV. Following the Bets

Various embodiments include a smart card delivery shoe that reads the suit and rank of each card before it is delivered to the various positions where cards are to be dealt in the play of the casino table card game. The cards are then dealt according to the rules of the game to the required card positions. Different games have diverse card distribution positions, different card numbers, and different delivery sequences that the hand identifying system of some embodiments of the invention may encompass. For example, in the most complex of card distribution games of blackjack, cards are usually dealt one at a time in sequence around a table, one card at a time to each player position and then to the dealer position. The one card at a time delivery sequence is again repeated so that each player position and the dealer position have an initial hand of exactly two cards. Complexity in hand development is introduced because players have essentially unlimited control over additional cards until point value in a hand exceeds a count of twenty-one. Players may stand with a count of 2 (two aces) or take a hit with a count of 21 if they are so inclined, so the knowledge of the count of a hand is no assurance of what a player will do. The dealer, on the other hand, is required to follow strict house rules on the play of the game according to the value of the dealer's hand. Small variances such as allowing or disallowing a hit on a "soft" seventeen count (e.g., an Ace and a 6) may exist, but the rules are otherwise very precise so that the house or dealer cannot exercise any strategy.

Other cards games may provide equal numbers of cards in batches. Variants of stud poker played against a dealer, for example, would usually provide hands of five cards, five at a time to each player position and if competing against a dealer, to the dealer position. This card hand distribution is quite simple to track as each sequence of five cards removed from the dealer shoe is a hand.

Other games may require cards to be dealt to players and other cards dealt to a flop or common card area. The system may also be programmable to cover this alternative if it is so desired.

Baccarat is closer to blackjack in card sequence of dealing, but has more rigid rules as to when hits may be taken by the player and the dealer, and each position may take a maximum of one card as a hit. The hand identification system of some embodiments of the invention may be able to address the needs of identifying hands in each of these types of games and especially may be able to identify hands in the a complex situation, the play of blackjack.

In various embodiments, where cameras are used to read cards, the light sensitive system may be any image capture system, digital or analog, that is capable of identifying the suit and rank of a card.

In various embodiments, a first step in the operation is to provide a set of cards to the smart delivery shoe, the cards being those cards that are going to be used in the play of a casino table card game. The set of cards (usually one or more decks) is provided in an already randomized set, being taken out of a shuffler or having been shuffled by hand. A smart delivery shoe is described in U.S. patent application Ser. No. 10/622,321, titled SMART DELIVERY SHOE, which application is incorporated herein in its entirety by reference. Some delivery systems or shoes with reading capability include, but are not limited to those disclosed in U.S. Pat. Nos. 4,750,743; 5,779,546; 5,605,334; 6,361,044; 6,217,447; 5,941,769; 6,229,536; 6,460,848; 5,722,893; 6,039,650; and 6,126,166. In various embodiments, the cards are read in the smart card delivery shoe, such as one card at a time in sequence. Reading cards by edge markings and special codes (as in U.S. Pat. No. 6,460,848) may require special encoding and marking of the cards. The entire sequence of cards in the set of cards may thus be determined and stored in memory. Memory may be at least in part in the smart delivery shoe, but communication with a central processor is possible. The sequence would then also or solely be stored in the central computer.

In various embodiments, the cards are then dealt out of the smart delivery shoe, the delivery shoe registering how many cards are removed one-at-a-time. This may be accomplished by the above identified U.S. patent application Ser. No. 10/622,321 where cards are fed to the dealer removal area one at a time, so only one card can be removed by the dealer. As each card is removed, a signal is created indicating that a specific card (of rank and suit) has been dealt. The computer and system knows only that a first card has been dealt, and it is presumed to go to the first player. The remaining cards are dealt out to players and dealer. In the play of certain games (e.g., stud variants) where specific numbers of cards are known to be dealt to each position, the shoe may be programmed with the number of players at any time, so hands can be correlated even before they have been dealt. If the shoe is playing a stud variant where each player and the dealer gets three cards (Three Card Poker™ game), the system may know in advance of the deal what each player and the dealer will have as a hand. It is also possible that there be a signal available when the dealer has received either his first card (e.g., when cards are dealt in sequence, one-at-a-time) or has received his entire hand. The signal may be used to automatically determine the number of player positions active on the table at any given time. For example, if in a hand of blackjack the dealer receives the sixth card, the system may immediately know that there are five players at the table. The signal can be given manually (pressing a button at the dealer position or on the smart card delivery shoe) or can be provided automatically (a card presence sensor at the dealer's position, where a card can be placed over the sensor to provide a signal). Where an automatic signal is provided by a sensor, some physical protection of the sensor may be provided, such as a shield that would prevent accidental contact with the sensor or blockage of the sensor. An L-shaped cover may be used so a card could be slid under the arm of the L parallel to the table surface and cover the sensor under that branch of the L. The signal can also be given after all cards for the hand have been delivered, again indicating the number of players, For example, when the dealer's two cards are slid under the L-shaped cover to block or contact the sensor, the system may know the total number of cards dealt on the hand (e.g., 10 cards), know that the dealer has 2 cards, determine that players therefore have 8 cards, and know that each player has 2 cards each, thereby absolutely determining that there are four active player positions at the table (10−2=8 and then 8/2=4 players). This automatic determination may serve as an alternative to having dealers input the number of players each hand at a table or having to manually change the indicated number of players at a table each time the number changes.

Once all active positions have been dealt to, the system may now know what cards are initially present in each player's hand, the dealer's hand, and any flop or common hand. The system operation may now be simple when no more cards are provided to play the casino table game. All hands may then be known and all outcomes may be predicted. The complication of additional cards will be addressed with respect to the game of blackjack.

After dealing the initial set of two cards per hand, the system may not immediately know where each remaining card will be dealt. The system may know what cards are dealt, however. It is with this knowledge and a subsequent identification of discarded hands that the hands and cards from the smart delivery shoe can be reconciled or verified. Each hand is already identified by the presence of two specifically known cards. Hands are then played according to the rules of the game, and hands are discarded when play of a hand is exhausted. A hand is exhausted when 1) there is a blackjack, the hand is paid, and the cards are cleared; 2) a hand breaks with a count over twenty-one and the cards are cleared; and/or a round of the game is played to a conclusion, the dealer's hand completed, all wagers are settled, and the cards are cleared. As is typically done in a casino to enable reconciling of hands manually, cards are picked up in a precise order from the table. The cards are usually cleared from the dealer's right to the dealer's left, and the cards at each position comprise the cards in the order that they were delivered, first card on the bottom, second card over the first card, third card over the second card, etc. maintaining the order or a close approximation of the order (e.g., the first two cards may be reversed) is important as the first two cards form an anchor, focus, basis, fence, end point or set edge for each hand. For example, if the third player position was known to have received the 10 of hearts (10H) and the 9 of spades (9S) for the first two card, and the fourth player was known to receive the 8 of diamonds (8D) and the 3 of clubs (3C) for the first two cards, the edges or anchors of the two hands are 9S/10H and 8D/3C. When the hands are swept at the conclusion of the game, the cards are sent to a smart discard rack (e.g., see U.S. patent application Ser. No. 10/622,388, which application is incorporated herein by reference in its entirety) and the hand with the 9S/10H was not already exhausted (e.g., broken or busted) and the swept cards consist of 9S, 10H, 8S, 8D and 3C (as read by the smart discard rack), the software of the processor may automatically know that the final hands in the third and fourth positions were a count of 19 (9S and 10H) for the third hand and 19 (8D and 3C originally plus the 8S hit) for the fourth hand. The analysis by the software specifically identifies the fourth hand as a count of 19 with the specific cards read by the smart discard shoe. The information from reading that now exhausted hand is compared with the original information collected from the smart delivery shoe. The smart delivery shoe information when combined with the smart discard rack information shall confirm the hands in each position, even though cards were not uniformly distributed (e.g., player one takes two hits for a total of four cards, player two takes three hits for a total of five cards, player three takes no hit for a total of two cards, player four takes one hit for a total of three cards, and the dealer takes two hits for a total of four cards).

The dealer's cards may be equally susceptible to analysis in a number of different formats. After the last card has been dealt to the last player, a signal may be easily and imperceptibly generated that the dealer's hand will now become active with possible hits. For example, with the sensor described above for sensing the presence of the first dealer card or the completion of the dealer's hand, the cards would be removed from beneath the L-shaped protective bridge. This type of movement is ordinarily done in blackjack where the dealer has at most a single card exposed and one card buried face down. In this case, the removal of the cards from over the sensor underneath the L-cover to display the hole card is a natural movement and then exposes the sensor. This can provide a signal to the central processor that the dealer's hand will be receiving all additional cards in that round of the game. The system at this point knows the two initial cards in the dealer's hand, knows the values of the next sequence of cards, and knows the rules by which a dealer may play. The system knows what cards the dealer will receive and what the final total of the dealer's hand will be because the dealer has no freedom of decision or movement in the play of the dealer's hand. When the dealer's hand is placed into the smart discard rack, the discard rack already knows the specifics of the dealer's hand even without having to use the first two cards as an anchor or basis for the dealer's hand. The cards may be treated in this manner in some embodiments.

When the hands are swept from the table, dealer's hand then players' hands from right to left (from the dealer's position or vice-versa if that is the manner of house play), the smart discard rack reads the shoes, identifies the anchors for each hand, knows that no hands swept at the conclusion can exceed a count of twenty-one, and the computer identifies the individual hands and reconciles them with the original data from the smart delivery shoe. The system thereby can identify each hand played and provide system assurance that the hand was played fairly and accurately.

If a lack of reconciling by the system occurs, a number of events can occur. A signal can be given directly to the dealer position, to the pit area, or to a security zone and the cards examined to determine the nature and cause of the error and inspect individual cards if necessary. When the hand and card data is being used for various statistical purposes, such as evaluating dealer efficiency, dealer win/loss events, player efficiency, player win/loss events, statistical habits of players, unusual play tactics or meaningful play tactics (e.g., indicative of card counting), and the like, the system may file the particular hand in a 'dump' file so that hand is not used in the statistical analysis, this is to assure that maximum benefits of the analysis are not tilted by erroneous or anomalous data.

Various embodiments may include date stamping of each card dealt (actual time and date defining sequence, with concept of specific identification of sequence identifier possibly being unique). The date stamping may also be replaced by specific sequence stamping or marking, such as a specific hand number, at a specific table, at a specific casino, with a specific number of players, etc. The records could indicate variations of indicators in the stored memory of the central computer of Lucky 777 Casino, Aug. 19, 1995, 8:12:17 a.m., Table 3, position 3, hand 7S/4D/9S, or simply identify something similar by alphanumeric code as L7C-819-95-3-3-073-7S/4D/9S (073 being the 73$^{rd}$ hand dealt). This date stamping of hands or even cards in memory can be used as an analytical search tool for security and to enhance hand identification.

FIG. 1 shows a block diagram of the minimum components for the hand-reading system on a table 4 of some embodiments, a smart card-reading delivery shoe 8 with output 14 and a smart card-reading discard rack 12 with output 18. Player positions 6 are shown, as is a dealer's hand position sensor 10 without output port 16.

The use of the discard rack acting to reconcile hands returned to the discard rack out-of-order (e.g., blackjack or bust) automatically may be advantageous, in some embodiments. The software as described above can be programmed to recognize hands removed out-of-dealing order on the basis of knowledge of the anchor cards (the first two cards) known to have been dealt to a specific hand. For example, the software will identify that when a blackjack was dealt to position three, that hand will be removed, the feed of the third hand into the smart card discard tray confirms this, and position three will essentially be ignored in future hand resolution. More importantly, when the anchor cards were, for example, 9S/5C in the second player position and an exhausted hand of 8D/9S/5C is placed into the smart discard rack, that hand will be identified as the hand from the second player position. If two identical hands happen to be dealt in the same round of play, the software will merely be alerted (it knows all of the hands) to specifically check the final order of cards placed into the smart discard rack to more carefully position the location of that exhausted hand. This is merely recognition software implementation once the concept is understood.

That the step of removal of cards from the dealer's sensor or other initiated signal identifies that all further cards are going to the dealer may be useful in defining the edges of play between rounds and in identifying the dealer's hand and the end of a round of play. When the dealer's cards are deposited and read in the smart discard rack, the central computer knows that another round of play is to occur and a mark or note may be established that the following sequence will be a new round and the analytical cycle may begin all over again.

The discard rack indicates that a complete hand has been delivered by absence of additional cards in the Discard Rack in-feed tray. When cards are swept from an early exhausted hand (blackjack or a break), they are swept one at a time and inserted into the smart discard rack one at a time. When the smart discard rack in-feed tray is empty, the system understands that a complete hand has been identified, and the system can reconcile that specific hand with the information from the smart delivery shoe. The system can be hooked-up to feed strategy analysis software programs such as the SMI licensed proprietary Bloodhound™ analysis program.

Various embodiments include a casino or cardroom game modified to include a progressive jackpot component. During the play of a Twenty-One game, for example, in addition to this normal wager, a player will have the option of making an additional wager that becomes part of, and makes the player eligible to win, the progressive jackpot. If the player's Twenty-One hand comprises a particular, predetermined arrangement of cards, the player will win all, or part of, the amount showing on the progressive jackpot. This progressive jackpot feature is also adaptable to any other casino or cardroom game such as Draw Poker, Stud Poker, Lo-Ball Poker or Caribbean Stud™ Poker. Various embodiments include a gaming table, such as those used for Twenty-One or poker, modified with the addition of a coin acceptor that is electronically connected to a progressive jackpot meter. When player drops a coin into the coin acceptor, a light is activated at the player's location indicating that he is participating in the progressive jackpot component of the game during that hand. At the same time, a signal from the coin acceptor is sent to the progressive meter to increment the amount shown on the progressive meter. At the conclusion of the play of each hand, the coin acceptor is reset for the next hand. When a player wins all or part of the progressive jackpot, the amount showing on the progressive jackpot meter is reduced by the amount won by the player. Any number of gaming tables can be connected to a single progressive jackpot meter.

XVI. Card Shufflers

Various embodiments include an automatic card shuffler, including a card mixer for receiving cards to be shuffled in first and second trays. Sensors detect the presence of cards in these trays to automatically initiate a shuffling operation, in which the cards are conveyed from the trays to a card mixer, which randomly interleaves the cards delivered to the mixing mechanism and deposits the interleaved cards in a vertically aligned card compartment.

A carriage supporting an ejector is reciprocated back and forth in a vertical direction by a reversible linear drive while the cards are being mixed, to constantly move the card ejector along the card receiving compartment. The reversible linear drive is preferably activated upon activation of the mixing means and operates simultaneously with, but independently of, the mixing means. When the shuffling operation is terminated, the linear drive is deactivated thereby randomly positioning the card ejector at a vertical location along the card receiving compartment.

A sensor arranged within the card receiving compartment determines if the stack of cards has reached at least a predetermined vertical height. After the card ejector has stopped and, if the sensor in the compartment determines that the stack of cards has reached at least the aforesaid predetermined height, a mechanism including a motor drive, is activated to move the wedge-shaped card ejector into the card receiving compartment for ejecting a group of the cards in the stack, the group selected being determined by the vertical position attained by the wedge-shaped card ejector.

In various embodiments, the card ejector pushes the group of cards engaged by the ejector outwardly through the forward open end of the compartment, said group of cards being displaced from the remaining cards of the stack, but not being completely or fully ejected from the stack.

The card ejector, upon reaching the end of its ejection stroke, detected by a microswitch, is withdrawn from the card compartment and returned to its initial position in readiness for a subsequent shuffling and card selecting operation.

In various embodiments, a technique for randomly selecting the group of cards to be ejected from the card compartment utilizes solid state electronic circuit means, which may comprise either a group of discrete solid state circuits or a microprocessor, either of which techniques preferably employ a high frequency generator for stepping a N-stage counter during the shuffling operation. When the shuffling operation is completed, the stepping of the counter is terminated. The output of the counter is converted to a DC signal, which is compared against another DC signal representative of the vertical location of the card ejector along the card compartment.

In various embodiments, a random selection is made by incrementing the N-stage counter with a high frequency generator. The high frequency generator is disconnected from the N-stage counter upon termination of the shuffling operation. The N-stage counter is then incremented by a very low frequency generator until it reaches its capacity count and resets. The reciprocating movement of the card ejector is terminated after completion of a time interval of random length and extending from the time the high frequency generator is disconnected from the N-stage counter to the time that the counter is advanced to its capacity count and reset by the low frequency generator, triggering the energization of the reciprocating drive, at which time the card ejector carriage coasts to a stop.

In various embodiments, the card ejector partially ejects a group of cards from the stack in the compartment. The partially displaced group of cards is then manually removed from the compartment. In another preferred embodiment, the ejector fully ejects the group of cards from the compartment, the ejected cards being dropped into a chute, which delivers the cards directly to a dealing shoe. The pressure plate of the dealing shoe is initially withdrawn to a position enabling the cards passing through the delivery shoe to enter directly into the dealing shoe, and is thereafter returned to its original position at which it urges the cards towards the output end of the dealing shoe.

Various embodiments include a method and apparatus for automatically shuffling and cutting playing cards and delivering shuffled and cut playing cards to the dispensing shoe without any human intervention whatsoever once the playing cards are delivered to the shuffling apparatus. In addition, the shuffling operation may be performed as soon as the play of each game is completed, if desired, and simultaneously with the start of a new game, thus totally eliminating the need to shuffle all of the playing cards (which may include six or eight decks, for example) at one time. Preferably, the cards played are collected in a "dead box" and are drawn from the dead box when an adequate number of cards have been accumulated for shuffling and cutting using the method of the present invention.

Various embodiments include a computer controlled shuffling and cutting system provided with a housing having at least one transparent wall making the shuffling and card delivery mechanism easily visible to all players and floor management in casino applications. The housing is provided with a reciprocally slidable playing card pusher which, in the first position, is located outside of said housing. A motor-operated transparent door selectively seals and uncovers an opening in the transparent wall to permit the slidably mounted card pusher to be moved from its aforementioned first position to a second position inside the housing whereupon the slidably mounted card pusher is then withdrawn to the first position, whereupon the playing cards have been deposited upon a motorized platform which moves vertically and selectively in the upward and downward directions.

The motor driven transparent door is lifted to the uncovered position responsive to the proper location of the motor driven platform, detected by suitable sensor means, as well as depression of a foot or hand-operated button accessible to the dealer.

The motor driven platform (or "elevator") lifts the stack of playing cards deposited therein upwardly toward a shuffling mechanism responsive to removal of the slidably mounted card pusher and closure of the transparent door whereupon the playing cards are driven by the shuffling mechanism in opposing directions and away from the stack to first and second card holding magazines positioned on opposing sides of the elevator, said shuffling mechanism comprising motor driven rollers rotatable upon a reciprocating mounting device, the reciprocating speed and roller rotating speed being adjustable. Alternatively, however, the reciprocating and rotating speeds may be fixed; if desired, employing motors having fixed output speeds, in place of the stepper motors employed in one preferred embodiment.

Upon completion of a shuffling operation, the platform is lowered and the stacks of cards in each of the aforementioned receiving compartments are sequentially pushed back onto the moving elevator by suitable motor-driven pushing mechanisms. The order of operation of the pushing mechanisms is made random by use of a random numbers generator employed in the operating computer for controlling the system. These operations can be repeated, if desired. Typically, new cards undergo these operations from two to four times.

Guide assemblies guide the movement of cards onto the platform, prevent shuffled cards from being prematurely returned to the elevator platform and align the cards as they fall into the card receiving regions as well as when they are pushed back onto the elevator platform by the motor-driven pushing mechanism.

Upon completion of the plurality of shuffling and cutting operations, the platform is again lowered, causing the shuffled and cut cards to be moved downwardly toward a movable guide plate having an inclined guide surface.

As the motor driven elevator moves downwardly between the guide plates, the stack of cards engages the inclined guide surface of a substantially U-shaped secondary block member causing the stack to be shifted from a horizontal orientation to a diagonal orientation. Substantially simultaneously therewith, a "drawbridge-like" assembly comprised of a pair of swingable arms pivotally mounted at their lower ends, are swung downwardly about their pivot pin from a vertical orientation to a diagonal orientation and serve as a diagonally aligned guide path. The diagonally aligned stack of cards slides downwardly along the inclined guide surfaces and onto the draw bridge-like arms and are moved downwardly therealong by the U-shaped secondary block member, under control of a stepper motor, to move cards toward and ultimately into the dealing shoe.

A primary block, with a paddle, then moves between the cut-away portion of the U-shaped secondary block, thus applying forward pressure to the stack of cards. The secondary block then retracts to the home position. The paddle is substantially rectangular-shaped and is aligned in a diagonal orientation. Upon initial set-up of the system the paddle is positioned above the path of movement of cards into the dealing shoe. The secondary block moves the cut and shuffled cards into the dealing shoe and the paddle is lowered to the path of movement of cards toward the dealing shoe and is moved against the rearwardmost card in the stack of cards delivered to the dealing shoe. When shuffling and cutting operations are performed subsequent to the initial set-up, the paddle rests against the rearwardmost card previously delivered to the dealing shoe. The shuffled and cut cards sliding along the guide surfaces of the diagonally aligned arms of the draw bridge-like mechanism come to rest upon the opposite surface of the paddle which serves to isolate the playing cards previously delivered to the dispensing shoe, as well as providing a slight pushing force urging the cards toward the outlet slot of the dispensing shoe thereby enabling the shuffling and delivering operations to be performed simultaneously with the dispensing of playing cards from the dispensing shoe.

After all of the newly shuffled playing cards have been delivered to the rear end of the dispensing shoe, by means of the U-shaped secondary block the paddle which is sandwiched between two groups of playing cards, is lifted to a position above and displaced from the playing cards. A movable paddle mounting assembly is then moved rearwardly by a motor to place the paddle to the rear of the rearmost playing card just delivered to the dispensing shoe; and the paddle is lowered to its home position, whereupon the motor controlling movement of the paddle assembly is then deenergized enabling the rollingly-mounted assembly supporting the paddle to move diagonally downwardly as playing cards are dispensed from the dispensing shoe to provide a force which is sufficient to urge the playing cards forwardly toward the playing card dispensing slot of the dealing shoe. The force acting upon the paddle assembly is the combination of gravity and a force exerted upon the paddle assembly by a constant tension spring assembly. Jogging (i.e., "dither") means cause the paddle to be jogged or reciprocated in opposing forward and rearward directions at periodic intervals to assure appropriate alignment, stacking and sliding movement of the stack of playing cards toward the card dispensing slot of the dealing shoe.

Upon completion of a game, the cards used in the completed game are typically collected by the dealer and placed in a dead box on the table. The collected cards are later placed within the reciprocally movable card pusher. The dealer has the option of inserting the cards within the reciprocally slidable card pusher into the shuffling mechanism or, alternatively, and preferably, may postpone a shuffling operation until a greater number of cards have been collected upon the reciprocally slidable card pusher. The shuffling and delivery operations may be performed as often or as infrequently as the dealer or casino management may choose. The shuffling and playing card delivery operations are fully automatic and are performed without human intervention as soon as cards are inserted within the machine on the elevator platform. The cards are always within the unobstructed view of the players to enable the players, as well as the dealer, to observe and thereby be assured that the shuffling, cutting and card delivery operations are being performed properly and without jamming and that the equipment is working properly as well. The shuffling and card delivery operations do not conflict or interfere with the dispensing of cards from the dispensing shoe, thereby permitting these operations to be performed substantially simultaneously, thus significantly reducing the amount of time devoted to shuffling and thereby greatly increasing the playing time, as well as providing a highly efficient random shuffling and cutting mechanism.

The system may be controlled by a microcomputer programmed to control the operations of the card shuffling and cutting system. The computer controls stepper motors through motor drive circuits, intelligent controllers and an opto-isolator linking the intelligent controllers to the computer. The computer also monitors a plurality of sensors to assure proper operation of each of the mechanisms of the system.

XVII. Casino Countermeasures

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XVIII. Video Wagering Games

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

XIX. Apparatus for Playing Over a Communications System

Figure 2:
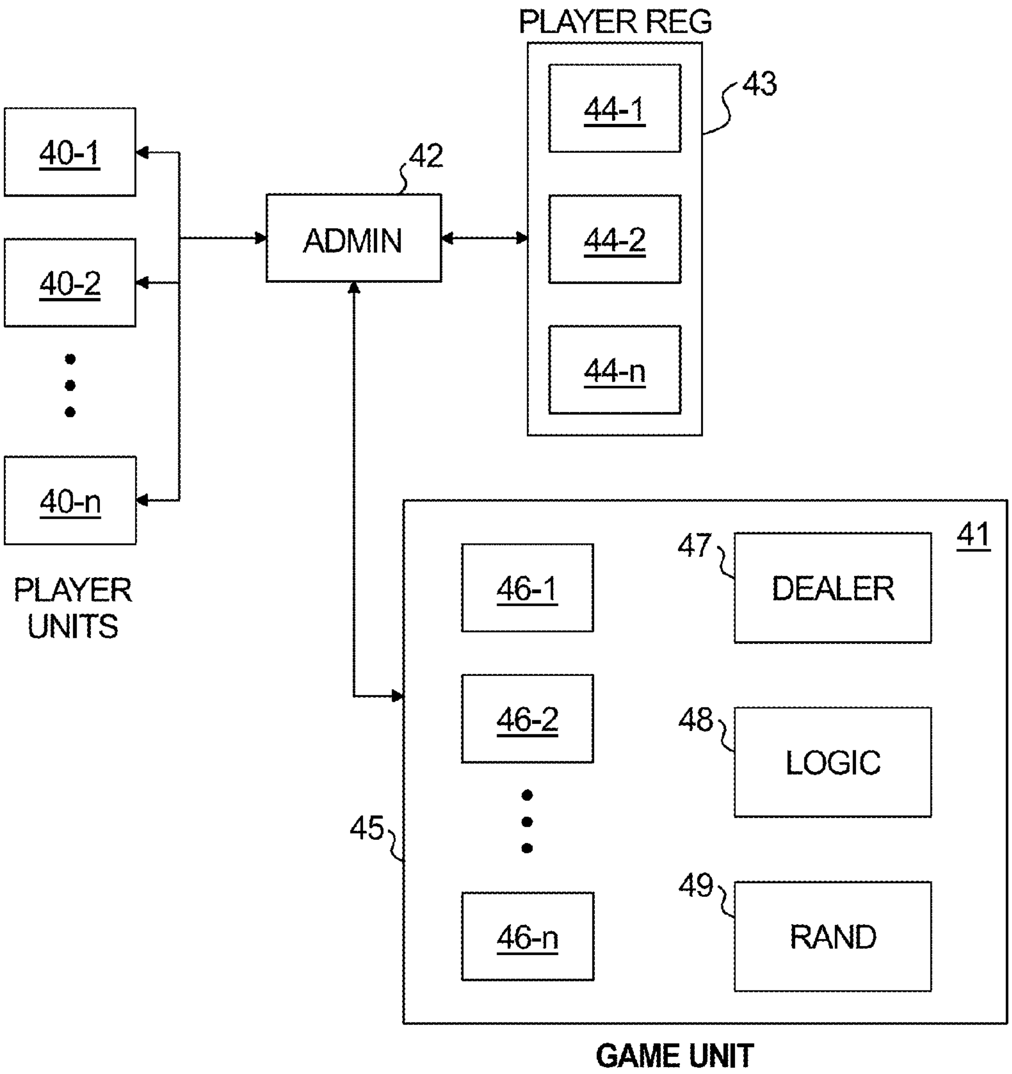
FIG. 2 shows apparatus for playing a game in some embodiments.

FIG. 2 shows apparatus for playing the game. There is a plurality of player units 40-1 to **40-*n* which are coupled via a communication system 41, such as the Internet, with a game playing system comprising an administration unit 42, a player register 43, and a game unit 45. Each unit 40** is typically a personal computer with a display unit and control means (a keyboard and a mouse).

When a player logs on to the game playing system, their unit 40 identifies itself to the administration unit. The system holds the details of the players in the register 43, which contains separate player register units 44-1 to **44-*n*** for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40, and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

XX. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XXI. References

The following patents and patent applications are hereby incorporated by reference herein for all purposes: U.S. Pat. Nos. 6,579,181, 6,299,536, 6,093,103, 5,941,769, 7,114,718, US patent application Ser. No. 10/622,321, U.S. Pat. Nos. 4,515,367, 5,000,453, 7,137,630, 7,137,629, U.S. patent application Ser. No. 11/063,311.

What is claimed is:

1. A method comprising:

monitoring, by a computing device, play of a player in a plurality of wagering games; generating, by the computing device, profile data for the player based on the monitored play;

determining, by the computing device, that an action by the player in a second game that is subsequent to the plurality of games results in a collusive outcome;

in response to determining that the action by the player results in the collusive outcome, determining, by the computing device, that the action deviates from the profile data based on the profile data includes determining a probability that the action is not in line with historical play of the player; and in response to determining that the action deviates from the profile data, taking, by the computing device, a collusion prevention action.

2. The method of claim 1, in which the collusive outcome includes a transfer of a large amount of chips from the player to another player in the second game.

3. The method of claim 1, in which determining that the action results in the collusive outcome includes determining a severity of collusion based on the collusive outcome and in which the determination that that action deviates from the profile data is adjusted to account for the severity so that a higher deviation is required to make the determination for a lower severity and a lower deviation is required to make the determination for a higher severity.

4. The method of claim 1, comprising determining a likelihood of collusion and presenting the likelihood to a collusion detector.

5. The method of claim 4, comprising determining a high likelihood of collusion in response to determining that the collusive outcome is a highly severe collusion and deviation from the profile data is great.

6. The method of claim 4, comprising determining a low likelihood of collusion in response to determining either a) that the collusive outcome is not severe or b) that deviation from the profile data is not great.

7. The method of claim 1, comprising determining an ongoing collusion rating for the player over the plurality of games based on a percentage of possible collusive actions detected over those games and present that collusion rating to a collusion detector.

8. The method of claim 1, in which the collusion prevention action includes presenting information to a collusion detector through a user interface that allows the collusion detector to perform at least one of undue a result of the second game, ban the player from gameplay, halt gameplay by the second player, and cause a replay of the second game.

9. The method of claim 8, comprising recording history of the second game, and in which the user interface allows the collusion detector to access recorded game history of the second game.

10. The method of claim 9, in which the user interface is configured to allow the collusion detector to access recorded game history in context of the game.

11. The method of claim 9, in which the game history allows the collusion detector to recreate the second game.

12. The method of claim 1, comprising storing the profile data in a vector, in which each dimension of the vector represents a determined behavior of the player.

13. The method of claim 12, in which one dimension of the vector includes a tightness of play dimension determined by a small blind completion percentage in poker games.

14. The method of claim 12, in which one dimension of the vector includes an aggression dimension determined by a bet and raise percentage post flop compared to a call percentage post flop in Texas hold 'em games.

15. The method of claim 12, in which dimensions of the vector are situationally-generic dimensions.

16. The method of claim 12, in which dimensions of the vector are specific to a context in which behavior is observed.

17. The method of claim 16, in which a context for a dimension of the vector is defined by at least one of a hole card strength and a hand strength of the player in the context.

18. The method of claim 12, comprising estimating a dimension for the vector when there is not sufficient information for the dimension by referencing one or more other dimensions in the vector.

19. The method of claim 12, comprising determining a dimension of the vector by weighting data so that more recent games are given more weight than less recent games for the dimension.

20. The method of claim 1, comprising generating the profile data to identify historical actions taken in each of a plurality of gaming situations.

21. The method of claim 1, comprising generating the profile data to identify historical actions taken against each of a plurality of types of players.

22. The method of claim 1, in which monitoring play of the player includes operating an electronic platform through which the player may play the plurality of games against a plurality of other players and determining actions in those games taken through the electronic platform.

23. An apparatus comprising: a computing device; and a non-transitory medium having stored thereon a plurality of instruction that when executed by the computing device cause the apparatus to: monitor play of a player in a plurality of wagering games;

generate by the computing device, profile data for the player based on the monitored play;

determine that an action by the player in a second game that is subsequent to the plurality of games results in a collusive outcome;

in responce to determining that the action by the player results in the collusive outcome, determine that the action deviates from the profile data based on the profile data includes determining a probability that the action is not in line with historical play of the player; and in responce to determining that the action deviates from the profile data, take a collusion prevention action.

* * * * *